(12) United States Patent
Yao et al.

(10) Patent No.: US 11,290,905 B2
(45) Date of Patent: Mar. 29, 2022

(54) MEASUREMENT METHOD AND DEVICE

(71) Applicant: HUAWEI TECHNOLOGIES CO., LTD., Shenzhen (CN)

(72) Inventors: Chuting Yao, Beijing (CN); Delai Zheng, Shanghai (CN); Jian Wang, Beijing (CN); Haibo Xu, Beijing (CN); Yiru Kuang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 43 days.

(21) Appl. No.: 16/759,196

(22) PCT Filed: May 17, 2018

(86) PCT No.: PCT/CN2018/087210
§ 371 (c)(1),
(2) Date: Apr. 24, 2020

(87) PCT Pub. No.: WO2019/080485
PCT Pub. Date: May 2, 2019

(65) Prior Publication Data
US 2020/0322827 A1    Oct. 8, 2020

(30) Foreign Application Priority Data

Oct. 25, 2017    (CN) .......................... 201711012270.4

(51) Int. Cl.
*H04W 24/10*    (2009.01)
*H04W 36/00*    (2009.01)
(Continued)

(52) U.S. Cl.
CPC .......... *H04W 24/10* (2013.01); *H04L 1/0026* (2013.01); *H04W 36/0058* (2018.08); *H04W 72/0446* (2013.01); *H04W 72/085* (2013.01)

(58) Field of Classification Search
CPC .......................... H04W 24/10; H04W 36/0058
See application file for complete search history.

(56) References Cited

U.S. PATENT DOCUMENTS

2009/0196250 A1    8/2009  Feng et al.
2014/0094162 A1    4/2014  Heo et al.
(Continued)

FOREIGN PATENT DOCUMENTS

CN    101262680 A    9/2008
CN    101330732 A    12/2008
(Continued)

OTHER PUBLICATIONS

3GPP TS 36.300 V14.4.0 (Sep. 2017),3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 14),total 329 pages.
(Continued)

*Primary Examiner* — Jeffrey M Rutkowski
*Assistant Examiner* — Chae S Lee
(74) *Attorney, Agent, or Firm* — Hauptman Ham, LLP

(57) ABSTRACT

A measurement method includes sending, by a first device to a second device, a message including a first configuration, wherein the first configuration indicates that a first event triggers the second device to send a first measurement message. The first event includes at least a channel quality of a measurement object is less than a first threshold, the channel quality of the measurement object is lower than a channel quality of a serving cell of the second device, the channel quality of the measurement object is less than the first threshold, and the channel quality of the serving cell of the second device is greater than a second threshold, or the channel quality of the measurement object is lower than the (Continued)

channel quality of the serving cell of the second device and the channel quality of the serving cell of the second device is greater than the second threshold.

16 Claims, 15 Drawing Sheets

(51) Int. Cl.
  *H04L 1/00* (2006.01)
  *H04W 72/04* (2009.01)
  *H04W 72/08* (2009.01)

(56) References Cited

U.S. PATENT DOCUMENTS

| | | |
|---|---|---|
| 2015/0029867 A1 | 1/2015 | Jung et al. |
| 2015/0045024 A1 | 2/2015 | Lunden et al. |
| 2015/0079972 A1 | 3/2015 | Drazynski et al. |
| 2015/0201338 A1 | 7/2015 | Gopal et al. |
| 2015/0245235 A1* | 8/2015 | Tang ............... H04W 72/0406 370/252 |
| 2015/0373598 A1* | 12/2015 | Tsuboi ............. H04W 36/0094 370/331 |
| 2016/0029262 A1 | 1/2016 | Heo et al. |
| 2016/0219587 A1 | 7/2016 | Lin et al. |
| 2016/0248533 A1* | 8/2016 | Li ....................... H04J 11/0073 |
| 2016/0302098 A1 | 10/2016 | Gheorghiu et al. |
| 2017/0094713 A1 | 3/2017 | Su et al. |
| 2018/0295547 A1 | 10/2018 | Tsuboi et al. |

FOREIGN PATENT DOCUMENTS

| | | |
|---|---|---|
| CN | 102685793 A | 9/2012 |
| CN | 102711167 A | 10/2012 |
| CN | 102958091 A | 3/2013 |
| CN | 103384387 A | 11/2013 |
| CN | 103765953 A | 4/2014 |
| CN | 104137621 A | 11/2014 |
| CN | 104717614 A | 6/2015 |
| CN | 104956711 A | 9/2015 |
| CN | 105430686 A | 3/2016 |
| CN | 106416350 A | 2/2017 |
| WO | 2017166549 A1 | 10/2017 |

OTHER PUBLICATIONS

European Search Report issued in corresponding European Application No. 18871448.9, dated Oct. 28, 2020, pp. 1-15, European Patent Office, Munich, Germany.

* cited by examiner

MEASUREMENT METHOD AND DEVICE

CROSS-REFERENCE TO RELATED APPLICATIONS

This application is a National Stage of International Application No. PCT/CN2018/087210, filed on May 17, 2018, which claims priority to Chinese Patent Application No. 201711012270.4, filed on Oct. 25, 2017.

TECHNICAL FIELD

Embodiments of the present invention relate to the field of communications technologies, and in particular, to a measurement method and a device.

BACKGROUND

In a cellular mobile communications system, a terminal device can communicate with a base station in a serving cell. If signal quality of the serving cell is poor, a cell handover may be performed. Before the cell handover, the terminal device measures signal quality of a target measurement cell, and reports a measurement report to the base station. The base station determines, based on the measurement result reported by the terminal device, whether to hand over the terminal device to the target measurement cell. Cell measurements performed by the terminal device are classified into intra-frequency measurements and inter-frequency measurements. The intra-frequency measurement is cell measurement performed when a serving cell currently serving the terminal device and a to-be-measured cell are in a same carrier frequency band. The inter-frequency measurement is cell measurement performed when a serving cell currently serving the terminal device and a to-be-measured cell are in different carrier frequency bands.

When the terminal device performs the inter-frequency measurement, if the terminal device has only one radio frequency receiver, the base station needs to configure a measurement gap (measurement gap) for the terminal device, to perform the measurement. Within a specified measurement gap length, the terminal device adjusts a frequency band of the radio frequency receiver to a frequency band of the to-be-measured cell, to perform the inter-frequency measurement. The terminal device does not exchange any data with the serving cell within the measurement gap length. After the measurement gap length ends, the terminal device adjusts the frequency band of the radio frequency receiver back to that of the serving cell.

The base station may set a measurement gap repetition period and a measurement gap length in the measurement gap repetition period. A plurality of to-be-measured cells operating in a to-be-measured frequency band may be measured within the measurement gap length. When a target measurement cell with good channel quality is measured, the terminal device reports a measurement result to the base station. When no target measurement cell with good signal quality is measured, the terminal device continues to perform the inter-frequency measurement within a measurement gap length in a next measurement gap period. However, when the terminal device is in a deep fading scenario or signal quality of other surrounding cells is comparatively poor, the terminal device needs to continuously perform the inter-frequency measurement within a reserved measurement gap length in each measurement gap period, and there is no measurement result to be reported. In addition, the base station does not exchange any data with the terminal device during the inter-frequency measurement. As a result, a time spent by the terminal device on data transmission is wasted.

SUMMARY

Embodiments of this application provide a measurement method and a device. This can reduce occupancy of a time domain resource for communication of the second device by a measurement gap, and reduce a time spent by the second device on data transmission, thereby improving service quality of the second device.

According to a first aspect, an embodiment of this application provides a measurement method, including: sending, by a first device to a second device, a message carrying a time parameter configuration. The time parameter configuration is used to configure a time at which the second device sends a first measurement message, or is used to configure a time at which the first device sends a first gap configuration to the second device. When configuring a measurement gap for the second device, the first device may send the time parameter configuration to the second device, and configure, by using the time parameter configuration, the time at which the first device sends the first gap configuration to the second device or the time at which the second device sends the first measurement message for measurement to the first device. If the second device detects no to-be-handed-over measurement object at a time point or within a time period indicated by the time parameter configuration, the first device may send the first gap configuration to the second device again based on the first measurement message or the time parameter configuration. This can reduce occupancy of a time domain resource for communication of the second device by the measurement gap, and reduce a time spent by the second device on data transmission, thereby improving service quality of the second device.

In an embodiment, the method further includes: sending, by the first device to the second device, a message carrying a second gap configuration and a first event configuration. The second gap configuration is used to configure a time resource used by the second device to perform measurement, and the first event configuration is used to configure an event used to trigger the second device to send a second measurement message.

In an embodiment, the method further includes: if the first device does not receive the second measurement message sent by the second device, at a time point in the time parameter configuration, or within a time period in the time parameter configuration, or at a time point obtained by increasing a time in the time parameter configuration by a first increment, or within a time period obtained by increasing a time in the time parameter configuration by a second increment, sending, by the first device to the second device, a message carrying the first gap configuration. The first gap configuration is different from the second gap configuration.

In an embodiment, the method further includes: if the first device receives the first measurement message sent by the second device, at a time point in the time parameter configuration, or within a time period in the time parameter configuration, or at a time point obtained by increasing a time in the time parameter configuration by a first increment, or within a time period obtained by increasing a time in the time parameter configuration by a second increment, sending, by the first device to the second device, a message carrying the first gap configuration. The first gap configuration is different from the second gap configuration.

In an embodiment, the second gap configuration, the first event configuration, and the time parameter configuration are carried in one message or different messages and sent to the second device.

In an embodiment, the measurement is inter-frequency measurement or inter-RAT measurement.

In an embodiment, the first device is a network device or a terminal device, and the second device is a network device or a terminal device.

According to a second aspect, an embodiment of this application provides a measurement method, including: receiving, by a second device from a first device, a message carrying a time parameter configuration, where the time parameter configuration is used to configure a time at which the second device sends a first measurement message; and sending, by the second device, the first measurement message at a time point in the time parameter configuration, or within a time period in the time parameter configuration, or at a time point obtained by increasing a time in the time parameter configuration by a time increment, or within a time period obtained by increasing a time in the time parameter configuration by a time increment. When receiving a measurement gap configuration sent by the first device, the second device may receive the time parameter configuration sent by the first device, and configure, by using the time parameter configuration, a time at which the second device receives a first gap configuration sent by the first device or the time at which the second device sends the first measurement message for measurement to the first device. If the second device detects no to-be-handed-over measurement object at the time point or within the time period indicated by the time parameter configuration, the first device may send the first gap configuration to the second device again based on the first measurement message or the time parameter configuration. This can reduce occupancy of a time domain resource for communication of the second device by a measurement gap, and reduce a time spent by the second device on data transmission, thereby improving service quality of the second device.

In an embodiment, before the sending, by the second device, the first measurement message, the method further includes: receiving, by the second device, a message that carries a second gap configuration and a first event configuration and that is sent by the first device. The second gap configuration is used to configure a time resource used by the second device to perform measurement, and the first event configuration is used to configure an event used to trigger the second device to send a second measurement message.

In an embodiment, after the sending, by the second device, the first measurement message, the method further includes: receiving, by the second device, a first gap configuration sent by the first device. The first gap configuration is different from the second gap configuration.

In an embodiment, the second gap configuration, the first event configuration, and the time parameter configuration are carried in one message or different messages and sent to the second device.

In an embodiment, the measurement is inter-frequency measurement or inter-RAT measurement.

In an embodiment, the first device is a network device or a terminal device, and the second device is a network device or a terminal device.

According to a third aspect, an embodiment of this application provides a measurement method, including: receiving, by a second device, a time parameter configuration from a first device, where the time parameter configuration is used to configure a time at which the second device receives a first gap configuration sent by the first device; and receiving, by the second device at a time point in the time parameter configuration, or within a time period in the time parameter configuration, or at a time point obtained by increasing a time in the time parameter configuration by a time increment, or within a time period obtained by increasing a time in the time parameter configuration by a time increment, the first gap configuration sent by the first device. When receiving a measurement gap configuration sent by the first device, the second device may receive the time parameter configuration sent by the first device, and configure, by using the time parameter configuration, the time at which the second device receives the first gap configuration sent by the first device. If the second device detects no to-be-handed-over measurement object at the time point or within the time period indicated by the time parameter configuration, the first device may send the first gap configuration to the second device again based on the first measurement message or the time parameter configuration, and after receiving the reconfigured first gap configuration sent by the first device, the second device performs measurement within a measurement gap based on a parameter of the reconfigured first gap configuration, to detect whether there is a to-be-handed-over measurement object. When channel quality of all measurement objects is poor, the reconfigured first gap configuration can be used to reduce frequent occupancy of uplink and downlink time domain resources of the second device by the measurement gap, thereby improving service quality of the second device.

In an embodiment, before the receiving, by the second device, the first gap configuration sent by the first device, the method further includes: receiving, by the second device, a second gap configuration and a first event configuration that are sent by the first device. The second gap configuration is used to configure a time resource used by the second device to perform measurement, and the first gap configuration is different from the second gap configuration; and the first event configuration is used to configure an event used to trigger the second device to send a second measurement message.

In an embodiment, the second gap configuration, the first event configuration, and the time parameter configuration are carried in one message or different messages and sent to the second device.

In an embodiment, the measurement is inter-frequency measurement or inter-RAT measurement.

In an embodiment, the first device is a network device or a terminal device, and the second device is a network device or a terminal device.

According to a fourth aspect, an embodiment of this application provides a measurement method, including: sending, by a first device to a second device, a message carrying a first configuration. The first configuration is used to indicate that a first event is used to trigger the second device to send a first measurement message, and the first event includes at least one of the following: Channel quality of a measurement object is less than a first threshold, the channel quality of the measurement object is lower than channel quality of a serving cell of the second device, the channel quality of the measurement object is less than the first threshold and the channel quality of the serving cell of the second device is greater than a second threshold, and the channel quality of the measurement object is lower than the channel quality of the serving cell of the second device and the channel quality of the serving cell of the second device is greater than the second threshold. The first event is defined in the first configuration sent by the first device to the second device. If there is no to-be-handed-over measurement object, the second device may be triggered, based on the received and newly defined first event, to send the first measurement message to the first device, and the second device may reconfigure a first gap configuration for the first device based on the first measurement message. The reconfigured first gap configuration can be used to reduce occupancy of a time domain resource for communication of the second device by a measurement gap, and reduce a time spent by the second device on data transmission, thereby improving service quality of the second device.

In an embodiment, that channel quality of a measurement object is less than a first threshold includes: The channel quality of the measurement object is less than a third threshold, or the channel quality of the measurement object is less than a sum of a third threshold and a first offset; that the channel quality of the measurement object is lower than channel quality of a serving cell of the second device includes: The channel quality of the measurement object is lower than the channel quality of the serving cell of the second device, or the channel quality of the measurement object is less than a sum of the channel quality of the serving cell of the second device and a second offset; and that the channel quality of the serving cell of the second device is greater than a second threshold includes: The channel quality of the serving cell of the second device is greater than a fourth threshold, or the channel quality of the serving cell of the second device is greater than a sum of a fourth threshold and a third offset.

In an embodiment, the method further includes: sending, by the first device to the second device, a message carrying a second gap configuration. The second gap configuration is used to configure a time resource used by the second device to perform measurement.

In an embodiment, after the sending, by the first device to the second device, a message carrying a second gap configuration, the method further includes: receiving, by the first device, the first measurement message sent by the second device; and sending, by the first device, a first gap configuration to the second device. The first gap configuration is different from the second gap configuration.

In an embodiment, the method further includes: sending, by the first device to the second device, a message carrying a second configuration. The second configuration is used to configure at least one of frequency information, cell information, or system information used by the second device to perform the measurement.

In an embodiment, the second configuration and the first configuration are carried in one message or different messages and sent to the second device.

In an embodiment, the first configuration is used to configure at least one of the first threshold, the second threshold, the third threshold, the fourth threshold, the first offset, the second offset, and the third offset.

In an embodiment, the measurement is inter-frequency measurement or inter-RAT measurement.

In an embodiment, the first device is a network device or a terminal device, and the second device is a network device or a terminal device.

According to a fifth aspect, an embodiment of this application provides a measurement method, including: receiving, by a second device, a message that carries a first configuration and that is sent by a first device, where the first configuration is used to indicate that a first event is used to trigger the second device to send a first measurement message, and the first event includes at least one of the following: Channel quality of a measurement object is less than a first threshold, the channel quality of the measurement object is lower than channel quality of a serving cell of the second device, the channel quality of the measurement object is less than the first threshold and the channel quality of the serving cell of the second device is greater than a second threshold, and the channel quality of the measurement object is lower than the channel quality of the serving cell of the second device and the channel quality of the serving cell of the second device is greater than the second threshold; and sending, by the second device, the first measurement message to the first device when the first event is triggered. If there is no to-be-handed-over measurement object, the second device may be triggered, based on the received and newly defined first event, to send the first measurement message to the first device, and the second device may reconfigure a first gap configuration for the first device based on the first measurement message. Compared with a second gap configuration, the first gap configuration can be used to reduce occupancy of a time domain resource for communication of the second device by a measurement gap, and reduce a time spent by the second device on data transmission, thereby improving service quality of the second device.

In an embodiment, that channel quality of a measurement object is less than a first threshold includes: The channel quality of the measurement object is less than a third threshold, or the channel quality of the measurement object is less than a sum of a third threshold and a first offset; that the channel quality of the measurement object is lower than channel quality of a serving cell of the second device includes: The channel quality of the measurement object is lower than the channel quality of the serving cell of the second device, or the channel quality of the measurement object is less than a sum of the channel quality of the serving cell of the second device and a second offset; and that the channel quality of the serving cell of the second device is greater than a second threshold includes: The channel quality of the serving cell of the second device is greater than a fourth threshold, or the channel quality of the serving cell of the second device is greater than a sum of a fourth threshold and a third offset.

In an embodiment, the method further includes: receiving, by the second device, a message that carries the second gap configuration and that is sent by the first device. The second gap configuration is used to configure a time resource used by the second device to perform measurement.

In an embodiment, after the receiving, by the second device, a message that carries the second gap configuration and that is sent by the first device, the method further includes: sending, by the second device, the first measurement message to the first device when the first event is triggered; and receiving, by the second device, a message that carries the first gap configuration and that is sent by the first device. The first gap configuration is different from the second gap configuration.

In an embodiment, the method further includes: receiving, by the first device, a message that carries a second configuration and that is sent by the second device. The second configuration is used to configure at least one of frequency information, cell information, or system information used by the second device to perform the measurement.

In an embodiment, the second configuration and the first configuration are carried in one message or different messages and sent to the second device.

In an embodiment, the first configuration is used to configure at least one of the first threshold, the second threshold, the third threshold, the fourth threshold, the first offset, the second offset, and the third offset.

In an embodiment, the measurement is inter-frequency measurement or inter-RAT measurement.

In an embodiment, the first device is a network device or a terminal device, and the second device is a network device or a terminal device.

In an embodiment, the first measurement message includes or indicates at least one of the following information: the channel quality of the measurement object, an identifier of the measurement object, information used to indicate that the second device detects no to-be-handed-over measurement object, and a measurement gap configuration expected by the second device.

In an embodiment, the measurement gap configuration expected by the second device includes any one or more of the following: a measurement gap repetition period expected by the second device, a measurement gap repetition period that is within a first time and that is expected by the second device, a measurement gap burst repetition period expected by the second device, a measurement gap burst repetition period that is within a second time and that is expected by the second device, a measurement gap length expected by the second device, a measurement gap length that is within a third time and that is expected by the second device, a quantity of repeated measurement gaps per burst that is expected by the second device, a quantity of repeated measurement gaps per burst that is within a fourth time and that is expected by the second device, that the second device expects to cancel the second gap configuration, and that the second device expects to cancel the second gap configuration within a fifth time. The measurement gap configuration expected by the second device may be one or more of a longer measurement gap repetition period, a shorter measurement gap length, a longer measurement gap burst repetition period, a smaller quantity of repeated measurement gaps per burst, and canceling the first measurement gap configuration. The foregoing configuration parameters may alternatively be set within a preset time. One or more of the foregoing configurations can be used to reduce occupancy of a time domain resource for communication of the second device by the measurement gap, and reduce a time spent by the second device on data transmission, thereby improving service quality of the second device.

In an embodiment, the first gap configuration is different from the second gap configuration, including at least one of the following: A measurement gap repetition period in the first gap configuration is greater than a measurement gap repetition period in the second gap configuration, a measurement gap repetition period in the first gap configuration is greater than a measurement gap repetition period in the second gap configuration within a sixth time, a measurement gap length in the first gap configuration is less than a measurement gap length in the second gap configuration, a measurement gap length in the first gap configuration is less than a measurement gap length in the second gap configuration within a seventh time, a measurement gap burst repetition period in the first gap configuration is greater than a measurement gap burst repetition period in the second gap configuration, a measurement gap burst repetition period in the first gap configuration is greater than a measurement gap burst repetition period in the second gap configuration within an eighth time, a quantity of repeated measurement gaps per burst in the first gap configuration is less than a quantity of repeated measurement gaps per burst in the second gap configuration, a quantity of repeated measurement gaps per burst in the first gap configuration is less than a quantity of repeated measurement gaps per burst in the second gap configuration within a ninth time, the first gap configuration is to cancel the second gap configuration, and the first gap configuration indicates that the second device cancels the second gap configuration within a tenth time. Compared with the second gap configuration, the reconfigured first gap configuration may be one or more of a longer measurement gap repetition period, a shorter measurement gap length, a longer measurement gap burst repetition period, and a smaller quantity of repeated measurement gaps per burst, and canceling the first measurement gap configuration. The foregoing configuration parameters may alternatively set within a preset time. One or more of the foregoing configurations can be used to reduce occupancy of a time domain resource for communication of the second device by a measurement gap, and reduce a time spent by the second device on data transmission, thereby improving service quality of the second device.

According to a sixth aspect, an embodiment of this application provides a measurement method, including:

determining, by a first device, a time parameter configuration. The time parameter configuration is used to configure a time at which the first device sends a first gap configuration to a second device. When configuring a measurement gap for the second device, the first device may set the time parameter configuration, and configure, by using the time parameter configuration, the time at which the first device sends the first gap configuration to the second device. If the second device detects no to-be-handed-over measurement object at a time point or within a time period indicated by the time parameter configuration, the first device may send the first gap configuration to the second device again based on the time parameter configuration. This can reduce occupancy of a time domain resource for communication of the second device by the measurement gap, and reduce a time spent by the second device on data transmission, thereby improving service quality of the second device.

In an embodiment, the method further includes: sending, by the first device to the second device, a message carrying a second gap configuration and a first event configuration. The second gap configuration is used to configure a time resource used by the second device to perform measurement, and the first event configuration is used to configure an event used to trigger the second device to send a second measurement message.

In an embodiment, the method further includes: if the first device does not receive the second measurement message sent by the second device, at the time point in the time parameter configuration, or within the time period in the time parameter configuration, or at a time point obtained by increasing a time in the time parameter configuration by a first increment, or within a time period obtained by increasing a time in the time parameter configuration by a second increment, sending, by the first device to the second device, a message carrying the first gap configuration. The first gap configuration is different from the second gap configuration.

In an embodiment, the second gap configuration, the first event configuration, and the time parameter configuration are carried in one message or different messages and sent to the second device.

In an embodiment, the measurement is inter-frequency measurement or inter-RAT measurement.

In an embodiment, the first device is a network device or a terminal device, and the second device is a network device or a terminal device.

According to a seventh aspect, an embodiment of this application provides a measurement method, including:

receiving, by a second device, a message that carries a second gap configuration and a first event configuration and that is sent by the first device, where the second gap configuration is used to configure a time resource used by the second device to perform measurement, and the first event configuration is used to configure an event used to trigger the second device to send a second measurement message; and performing, by the second device at a time point or within a time period indicated by a time parameter configuration determined by the first device, the measurement within a measurement gap based on the second gap configuration and the first event configuration, where the time parameter configuration is used to configure a time at which the first device sends a first gap configuration to the second device. When configuring the measurement gap for the second device, the first device may set the time parameter configuration, and configure, by using the time parameter configuration, the time at which the first device sends the first gap configuration to the second device. If the second device detects no to-be-handed-over measurement object at the time point or within the time period indicated by the time parameter configuration, the first device may send the first gap configuration to the second device again based on the time parameter configuration. This can reduce occupancy of a time domain resource for communication of the second device by the measurement gap, and reduce a time spent by the second device on data transmission, thereby improving service quality of the second device.

In an embodiment, the method further includes: if the first device does not receive the second measurement message sent by the second device, at the time point in the time parameter configuration, or within the time period in the time parameter configuration, or at a time point obtained by increasing a time in the time parameter configuration by a first increment, or within a time period obtained by increasing a time in the time parameter configuration by a second increment, receiving, by the second device, a message that carries the first gap configuration and that is sent by the first device. The first gap configuration is different from the second gap configuration.

In an embodiment, the second gap configuration, the first event configuration, and the time parameter configuration are carried in one message or different messages and received by the second device.

In an embodiment, the measurement is inter-frequency measurement or inter-RAT measurement.

In an embodiment, the first device is a network device or a terminal device, and the second device is a network device or a terminal device.

According to an eighth aspect, an embodiment of this application provides a first device. The first device includes a module or a unit configured to perform the measurement method provided in any one of the first aspect or the possible implementations of the first aspect.

According to a ninth aspect, an embodiment of this application provides a second device. The second device includes a module or a unit configured to perform the measurement method provided in any one of the second aspect or the possible implementations of the second aspect.

According to a tenth aspect, an embodiment of this application provides a second device. The second device includes a module or a unit configured to perform the measurement method provided in any one of the third aspect or the possible implementations of the third aspect.

According to an eleventh aspect, an embodiment of this application provides a first device. The first device includes a module or a unit configured to perform the measurement method provided in any one of the fourth aspect or the possible implementations of the fourth aspect.

According to a twelfth aspect, an embodiment of this application provides a second device. The second device includes a module or a unit configured to perform the measurement method provided in any one of the fifth aspect or the possible implementations of the fifth aspect.

According to a thirteenth aspect, an embodiment of this application provides a first device. The first device includes a module or a unit configured to perform the measurement method provided in any one of the sixth aspect or the possible implementations of the sixth aspect.

According to a fourteenth aspect, an embodiment of this application provides a second device. The second device includes a module or a unit configured to perform the measurement method provided in any one of the seventh aspect or the possible implementations of the seventh aspect.

According to a fifteenth aspect, an embodiment of this application provides a first device, including: a processor, a memory, a transceiver, and a bus. The processor, the transceiver, and the memory communicate with each other by using the bus. The transceiver is configured to receive and send data, the memory is configured to store an instruction, and the processor is configured to invoke the instruction in the memory, to perform the measurement method provided in any one of the first aspect or the possible implementations of the first aspect.

According to a sixteenth aspect, an embodiment of this application provides a second device, including: a processor, a memory, a transceiver, and a bus. The processor, the transceiver, and the memory communicate with each other by using the bus. The transceiver is configured to receive and send data, the memory is configured to store an instruction, and the processor is configured to invoke the instruction in the memory, to perform the measurement method provided in any one of the second aspect or the possible implementations of the second aspect.

According to a seventeenth aspect, an embodiment of this application provides a second device, including: a processor, a memory, a transceiver, and a bus. The processor, the transceiver, and the memory communicate with each other by using the bus. The transceiver is configured to receive and send data, the memory is configured to store an instruction, and the processor is configured to invoke the instruction in the memory, to perform the measurement method provided in any one of the third aspect or the possible implementations of the third aspect.

According to an eighteenth aspect, an embodiment of this application provides a first device, including: a processor, a memory, a transceiver, and a bus. The processor, the transceiver, and the memory communicate with each other by using the bus. The transceiver is configured to receive and send data, the memory is configured to store an instruction, and the processor is configured to invoke the instruction in the memory, to perform the measurement method provided in any one of the fourth aspect or the possible implementations of the fourth aspect.

According to a nineteenth aspect, an embodiment of this application provides a second device, including: a processor, a memory, a transceiver, and a bus. The processor, the transceiver, and the memory communicate with each other by using the bus. The transceiver is configured to receive and send data, the memory is configured to store an instruction, and the processor is configured to invoke the instruction in the memory, to perform the measurement method provided in any one of the fifth aspect or the possible implementations of the fifth aspect.

According to a twentieth aspect, an embodiment of this application provides a first device, including: a processor, a memory, a transceiver, and a bus. The processor, the transceiver, and the memory communicate with each other by using the bus. The transceiver is configured to receive and send data, the memory is configured to store an instruction, and the processor is configured to invoke the instruction in the memory, to perform the measurement method provided in any one of the sixth aspect or the possible implementations of the sixth aspect.

According to a twenty-first aspect, an embodiment of this application provides a second device, including: a processor, a memory, a transceiver, and a bus. The processor, the transceiver, and the memory communicate with each other by using the bus. The transceiver is configured to receive and send data, the memory is configured to store an instruction, and the processor is configured to invoke the instruction in the memory, to perform the measurement method provided in any one of the seventh aspect or the possible implementations of the seventh aspect.

According to a twenty-second aspect, an embodiment of this application provides a computer-readable storage medium. The storage medium includes an instruction, and when the instruction is run on a device, the device is enabled to perform the measurement method provided in any one of the first aspect or the possible implementations of the first aspect.

According to a twenty-third aspect, an embodiment of this application provides a computer-readable storage medium. The storage medium includes an instruction, and when the instruction is run on a device, the device is enabled to perform the measurement method provided in any one of the second aspect or the possible implementations of the second aspect.

According to a twenty-fourth aspect, an embodiment of this application provides a computer-readable storage medium. The storage medium includes an instruction, and when the instruction is run on a device, the device is enabled to perform the measurement method provided in any one of the third aspect or the possible implementations of the third aspect.

According to a twenty-fifth aspect, an embodiment of this application provides a computer-readable storage medium. The storage medium includes an instruction, and when the instruction is run on a device, the device is enabled to perform the measurement method provided in any one of the fourth aspect or the possible implementations of the fourth aspect.

According to a twenty-sixth aspect, an embodiment of this application provides a computer-readable storage medium. The storage medium includes an instruction, and when the instruction is run on a device, the device is enabled to perform the measurement method provided in any one of the fifth aspect or the possible implementations of the fifth aspect.

According to a twenty-seventh aspect, an embodiment of this application provides a computer-readable storage medium. The storage medium includes an instruction, and when the instruction is run on a device, the device is enabled to perform the measurement method provided in any one of the sixth aspect or the possible implementations of the sixth aspect.

According to a twenty-eighth aspect, an embodiment of this application provides a computer-readable storage medium. The storage medium includes an instruction, and when the instruction is run on a device, the device is enabled to perform the measurement method provided in any one of the seventh aspect or the possible implementations of the seventh aspect.

According to a twenty-ninth aspect, an embodiment of this application provides a computer program. The computer program includes an instruction, and when the instruction is run on a device, the device is enabled to perform the measurement method provided in any one of the first aspect or the possible implementations of the first aspect.

According to a thirtieth aspect, an embodiment of this application provides a computer program. The computer program includes an instruction, and when the instruction is run on a device, the device is enabled to perform the measurement method provided in any one of the second aspect or the possible implementations of the second aspect.

According to a thirty-first aspect, an embodiment of this application provides a computer program. The computer program includes an instruction, and when the instruction is run on a device, the device is enabled to perform the measurement method provided in any one of the third aspect or the possible implementations of the third aspect.

According to a thirty-second aspect, an embodiment of this application provides a computer program. The computer program includes an instruction, and when the instruction is run on a device, the device is enabled to perform the measurement method provided in any one of the fourth aspect or the possible implementations of the fourth aspect.

According to a thirty-third aspect, an embodiment of this application provides a computer program. The computer program includes an instruction, and when the instruction is run on a device, the device is enabled to perform the measurement method provided in any one of the fifth aspect or the possible implementations of the fifth aspect.

According to a thirty-fourth aspect, an embodiment of this application provides a computer program. The computer program includes an instruction, and when the instruction is run on a device, the device is enabled to perform the measurement method provided in any one of the sixth aspect or the possible implementations of the sixth aspect.

According to a thirty-fifth aspect, an embodiment of this application provides a computer program. The computer program includes an instruction, and when the instruction is run on a device, the device is enabled to perform the measurement method provided in any one of the seventh aspect or the possible implementations of the seventh aspect.

According to a thirty-sixth aspect, an embodiment of this application provides a chip product of a device, to perform the method in the first aspect or any possible implementation of the first aspect.

According to a thirty-seventh aspect, an embodiment of this application provides a chip product of a device, to perform the method in the second aspect or any possible implementation of the second aspect.

According to a thirty-eighth aspect, an embodiment of this application provides a chip product of a device, to perform the method in the third aspect or any possible implementation of the third aspect.

According to a thirty-ninth aspect, an embodiment of this application provides a chip product of a device, to perform the method in the fourth aspect or any possible implementation of the fourth aspect.

According to a fortieth aspect, an embodiment of this application provides a chip product of a device, to perform the method in the fifth aspect or any possible implementation of the fifth aspect.

According to a forty-first aspect, an embodiment of this application provides a chip product of a device, to perform the method in any one of the sixth aspect or the possible implementations of the sixth aspect.

According to a forty-second aspect, an embodiment of this application provides a chip product of a device, to perform the method in any one of the seventh aspect or the possible implementations of the seventh aspect.

When configuring a measurement gap for a second device, a first device may send a time parameter configuration to the second device, and configure, by using the time parameter configuration, a time at which the first device sends a first gap configuration to the second device or a time at which the second device sends a first measurement message for measurement to the first device. If the second device detects no to-be-handed-over measurement object at a time point or within a time period indicated by the time parameter configuration, the first device may send the first gap configuration to the second device again based on the first measurement message or the time parameter configuration. The first gap configuration may be one or more of a longer measurement gap repetition period, a shorter measurement gap length, a longer measurement gap burst repetition period, and a smaller quantity of repeated measurement gaps per burst, and canceling a first measurement gap configuration. The foregoing configuration parameters may alternatively be set within a preset time. One or more of the foregoing configurations can be used to reduce occupancy of a time domain resource for communication of the second device by the measurement gap, and reduce a time spent by the second device on data transmission, thereby improving service quality of the second device.

BRIEF DESCRIPTION OF DRAWINGS

To describe the technical solutions in the embodiments of this application or in the Background more clearly, the following describes the accompanying drawings required for describing the embodiments of this application or the Background.

DESCRIPTION OF EMBODIMENTS

Terms used in implementations of this application are merely used to explain specific embodiments of this application, but are not intended to limit this application.

To better understand the embodiments of this application, a network system in this application is first described.

Figure 1:
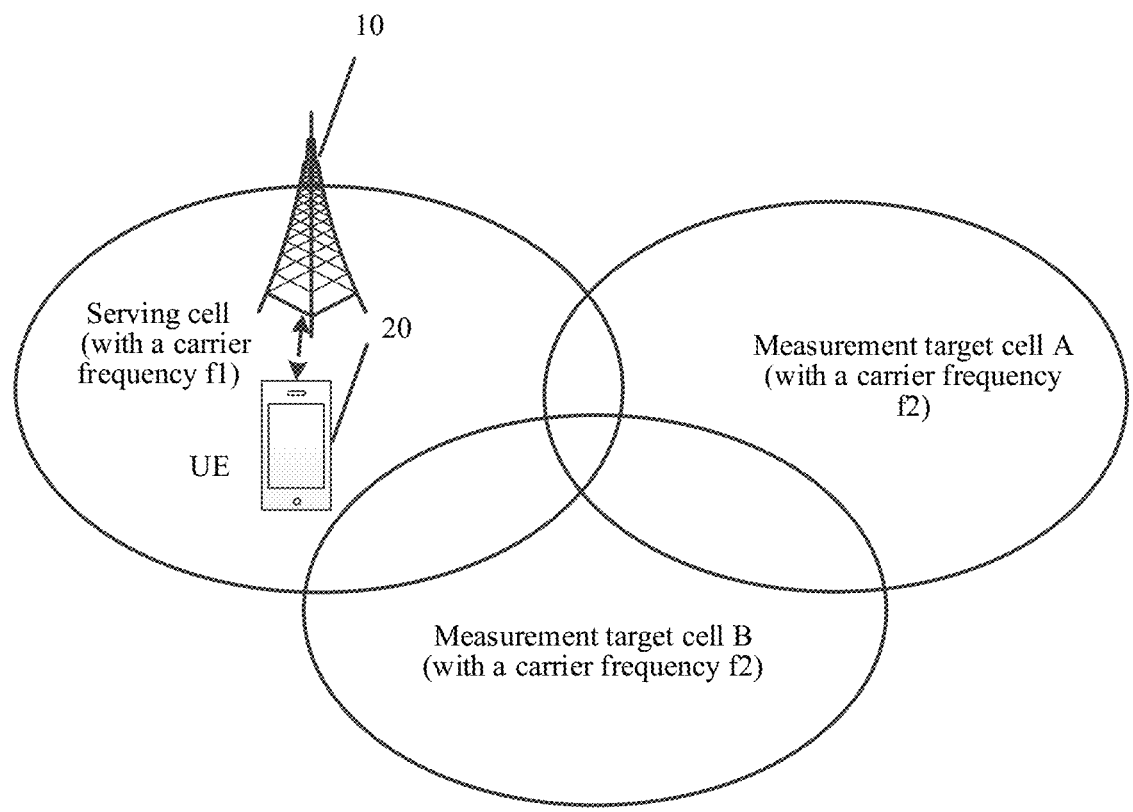
FIG. 1 is a schematic architecture diagram of a network system according to an embodiment of the present invention.

FIG. 1 is a schematic architecture diagram of a network system according to an embodiment of the present invention. As shown in FIG. 1, the network system includes a first device 10 and a second device 20. The first device 10 and the second device 20 may establish a communication connection, and exchange data through the communication connection. In this embodiment of this application, that the first device 10 is a network device and the second device 20 is a terminal device is used as an example for description. It may be understood that, the following cases may be included in this application: The first device 10 is a network device and the second device 20 is a network device, the first device 10 is a terminal device and the second device 20 is a terminal device, or the first device 10 is a terminal device and the second device 20 is a network device. In a method process and a device in this application, the first device may be either a network device or a terminal device, and the second device may be either a network device or a terminal device. This is not limited in this application.

In a cellular mobile communications system, an area covered by a network device 10 or an area covered by one or more sector antennas of a network device 10 may be referred to as a cell. Within this area, as shown in FIG. 1, a terminal device 20 may communicate with the network device 10 through a wireless channel. A cell in which the terminal device 20 communicates with the network device 10 may be referred to as a serving cell of the terminal device 20. A frequency at which the terminal device 20 communicates with the network device 10 in the cell is a carrier frequency of the cell. As shown in FIG. 1, data transmitted between the network device 10 and the terminal device 20 through the wireless channel is borne on a carrier with a fixed frequency (or a fixed frequency band), and the frequency (or a center frequency) may be referred to as the carrier frequency of the serving cell.

The network device 10 may be a base station. The base station may be configured to communicate with one or more terminal devices 20, or may be configured to communicate with one or more base stations having some functions of the terminal device (for example, a macro base station communicates with a micro base station such as an access point). The base station may be a base transceiver station (base transceiver station, BTS) in a time division-synchronous code division multiple access (time division synchronous code division multiple access, TD-SCDMA) system, or an evolved NodeB (evolutional node B, eNB) in a long term evolution (long term evolution, LTE) system, and a base station in a 5th generation (5th-Generation, 5G) mobile communications system or a new radio (new radio, NR) system. In addition, the base station may alternatively be an access point (access point, AP), a transmission node (transmission and receiving point, TRP), a central unit (central unit, CU), or another network entity, and may include some or all of functions of the foregoing network entities. In a future communications system, the network device 10 may alternatively have another name. This is not specifically limited in this embodiment of the present invention.

The terminal device 20 may be removable user equipment (user equipment, UE), an access terminal, a subscriber unit, a subscriber station, a mobile station, a mobile console, a remote station, a remote terminal, a user terminal, or a user agent. The access terminal may be a cellular phone, a handheld device, a computing device or a vehicle-mounted device having a wireless communication function, a wearable device, a terminal in a 5G system, a terminal in a future evolved public land mobile network (public land mobile network, PLMN), or the like. Specifically, the terminal device 20 may be a mobile phone (mobile phone), a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

Specific technologies and specific device forms used by the network device 10 and the terminal device 20 are not limited in this embodiment of this application. The communications system shown in FIG. 1 is merely intended to more clearly describe the technical solutions in this application, but constitutes no limitation on this application. A person of ordinary skill in the art may know that, with evolution of the network system and emergence of a new service scenario, the technical solutions provided in this application are also applicable to a similar technical problem. For example, a cell is used as a measurement object of a first device below for description. It may be understood that, the measurement object is not limited to cell measurement scenario. This application is also applicable to a similar service scenario. This is not limited in this application.

When channel quality of the serving cell serving the terminal device 20 is comparatively poor, communication between the network device 10 and the terminal device 20 is affected. For example, the terminal device 20 is located at an edge of the serving cell, or the terminal device 20 is located in an area in which channel quality severely deteriorates, such as a garage or an elevator. In this case, to ensure comparatively good data communication of the terminal device 20, channel quality of a cell adjacent to the serving cell may be detected. As shown in FIG. 1, the terminal device 20 may perform data communication by using a serving cell of the network device 10, and a carrier frequency is f1 during communication. The cell to be detected by the terminal device 20 may be referred to as a target measurement cell. There may be one or more target measurement cells. As shown in FIG. 1, the target measurement cells may include a target measurement cell A and a target measurement cell B. A carrier frequency of the target measurement cell may be the same as or different from that of the serving cell. As shown in FIG. 1, carrier frequencies of the target measurement cell A and the target measurement cell B are both f2. The target measurement cell and the serving cell may be in a same communications system, or may be in different communications systems. This is not limited in this application. For example, the communications system is a 3GPP or 5G mobile communications system, a global system for mobile communications (universal mobile telecommunications system UMTS), a code division multiple access (Code Division Multiple Access, CDMA) communications system, a global system for mobile communications (Global System for Mobile Communications, GSM), or a Wi-Fi communications system. In addition, the communications system may be a newly emerged or newly defined communications system in the future. This is not limited in this application.

Channel quality measurements are classified into intra-frequency measurements and inter-frequency measurements depending on whether the carrier frequency of the target measurement cell is the same as that of the serving cell. The intra-frequency measurement is cell measurement performed by the terminal device 20 when the carrier frequency of the target measurement cell is the same as the carrier frequency of the serving cell of the terminal device 20. As shown in FIG. 1, when f1=f2, the terminal device 20 performs the intra-frequency measurement based on a configuration of the network device 10. The intra-frequency measurement is cell measurement performed by the terminal device 20 when the carrier frequency of the target measurement cell is different from the carrier frequency of the serving cell of the terminal device 20. As shown in FIG. 1, when f1≠ f2, the terminal device 20 performs the intra-frequency measurement based on a configuration of the network device 10. During the inter-frequency measurement, a carrier frequency of a transmitter of the terminal device 20 is still the carrier frequency of the serving cell. Therefore, to perform the inter-frequency measurement, the carrier frequency of the transmitter of the terminal device 20 needs to be adjusted to the carrier frequency of the target measurement cell before the channel quality measurement is performed. The 3rd generation partnership project (3rd generation partnership project, 3GPP) proposes a measurement gap manner to complete the foregoing process. To be specific, a period of time is reserved, and within this period of time, the terminal device 20 does not exchange any data with the network device 10, but adjusts the carrier frequency to that of the target measurement cell, and measures inter-frequency channel quality. This reserved period of time may be referred to as a measurement gap length (measurement gap length, MGL).

When inter-frequency or inter-RAT measurement needs to be performed, the network device 10 sends a measurement gap related configuration to the terminal device 20. A measurement configuration configured by the network device 10 for the terminal device 20 may include a gap configuration and an event configuration. The following separately describes the gap configuration and the event configuration.

(1) Gap configuration: The gap configuration may be a time resource configured by the network device to perform measurement, and the gap configuration may be performed periodically.

The gap configuration may include a plurality of patterns, and parameter configurations (such as an MGL, a measurement gap repetition period, and an LMGRP) are different in different patterns. In a pattern, an MGL is 6 ms, and a measurement gap repetition period (measurement gap repetition period, MGRP) is 40 ms, that is, a time interval at which a measurement gap repeatedly occurs twice is 40 ms. In another pattern, an MGL is 6 ms and an MGRP is 80 ms. A specific pattern used for performing a measurement is determined by a parameter gapOffset, and the parameter is delivered by the network device 10 to the terminal device 20 by using a message carrying measurement configuration information.

Figure 2:
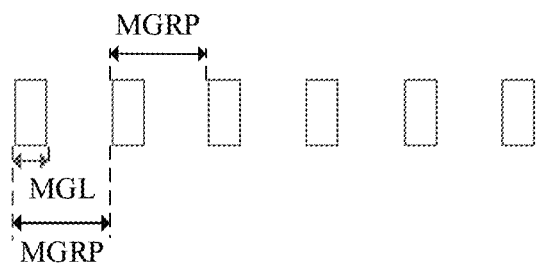
FIG. 2 is a schematic diagram of a gap configuration of a uniform measurement gap in the prior art.
Figure 3:
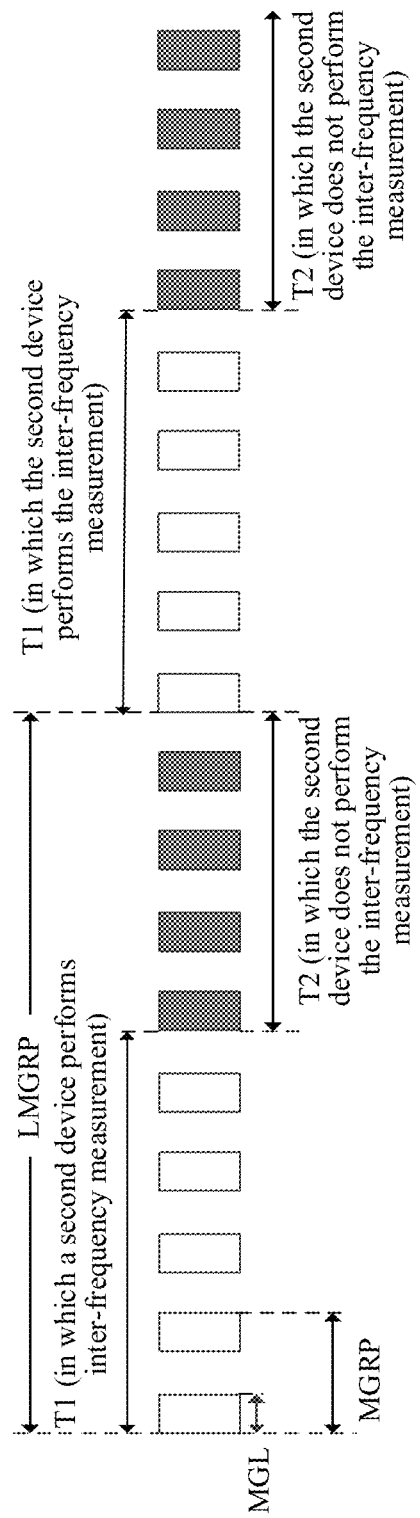
FIG. 3 is a schematic diagram of a gap configuration of a non-uniform measurement gap in the prior art.

The gap patterns may be classified into uniform (uniform) gap patterns and non-uniform (non-uniform) gap patterns. FIG. 2 is a schematic diagram of a gap configuration of a uniform measurement gap in the prior art. As shown in FIG. 2, a terminal device performs inter-frequency measurement within an MGL, and the MGL occurs every MGRP, that is, the terminal device performs the inter-frequency measurement every MGRP. There may be a non-uniform measurement gap. The non-uniform measurement gap means that, within a burst repetition period (burst repetition period), the measurement gap is included in only a part of the burst repetition period. FIG. 3 is a schematic diagram of a gap configuration of a non-uniform measurement gap in the prior art. As shown in FIG. 3, within one burst repetition period, that is, within an LMGRP, the burst repetition period is divided into two parts: T1 and T2. Within T1, the network device 10 configures a parameter configuration in the foregoing gap configuration pattern for the terminal device 20, and the terminal device 20 performs inter-frequency measurement based on the parameter configuration. Within T1, the inter-frequency measurement may be performed for a plurality of times, and a quantity of times for performing the inter-frequency measurement is determined by a quantity of repeated measurement gaps per burst (number of gaps per burst). The quantity of repeated measurement gaps per burst is a quantity of MGRPs included in the T1, and may be 13. However, within T2, the network device does not configure, for the terminal device 20, any time resource for the inter-frequency measurement. Period duration of the burst repetition period may be indicated by gapOffset when a measurement gap pattern is configured. The period duration of the burst repetition period (LMGRP) may be any one of the following: 1.28 s, 2.56 s, 5.12 s, 10.24 s, and the like.

(2) Event configuration: The network device 10 configures an event (that is, a trigger condition) used by the terminal device 20 to report a measurement report. In other words, once detecting that the trigger condition is met, the terminal device 20 reports the measurement report to the network device 10.

Specifically, the event configuration may be an intra-RAT measurement event identified by Ax, for example, one or more of an A3 event, an A4 event, an A5 event, and the like; or may be an inter-RAT measurement event, for example, a B1 event. Herein, intra-RAT means a same communications system, and inter-RAT means different communications systems. It should be noted that, a measurement method process and a device in this application may be applied to either inter-frequency measurement or inter-RAT measurement.

For the event configuration, using the A3 event as an example for description, a trigger condition of the A3 event is that channel quality of a target measurement cell is one threshold greater than channel quality of a serving cell. The trigger condition may be that the terminal device is triggered to report a measurement report only after the trigger condition is met within a timing of a preset timer. The threshold may be preconfigured by the network device 10 for the terminal device 20. If the event configuration configured for the terminal device 20 is the A3 event, within an MGL of a measurement gap, the terminal device 20 needs to meet the trigger condition of the A3 event. In other words, the terminal device 20 is triggered to report the measurement report only after channel quality of a target measurement cell detected by the terminal device 20 is one threshold greater than the channel quality of the serving cell within a preset timing.

Content of the measurement report reported by the terminal device 20 may include an identifier used to identify current measurement, a measurement result (the channel quality and the like) of the serving cell, and a measurement result (the channel quality and the like) of the target measurement cell. Based on the received measurement report, the network device 10 may configure the terminal device 20 for cell handover. The event configuration is described above by using the A3 event as an example. It may be understood that, in this application, the event configuration is not limited to the A3 event, or may be one or more of the A4 event, the A5 event, and the B1 event in the 3GPP standard. For specific descriptions of the events, refer to the 3GPP standard, and details are not described herein.

In this embodiment of this application, the measurement report may be sent by the terminal device 20 to the network device 10 by using a measurement message.

The gap configuration pattern, the gap configuration parameters (such as the MGRP, the LMGRP, the quantity of repeated measurement gaps per burst, and the MGL) and the event configuration are not limited to definitions and descriptions in an existing standard. Definitions of these concepts in future communications systems (such as 5G and new radio systems) may change, and this does not affect applicability of this application.

In the prior art, when channel quality of a serving cell is poor, configuring a measurement gap by the network device 10 for the terminal device 20 is to expect to find a target measurement cell with better channel quality. However, when channel quality of all target measurement cells is poor, the terminal device 20 performs inter-frequency measurement continuously based on the configured measurement gap, and cannot find a to-be-handed-over target measurement cell. In addition, within an MGL of the configured measurement gap, the terminal device 20 cannot perform data communication, and the measurement gap frequently occupies uplink and downlink time domain resources of the terminal device 20. This results in a resource waste and deteriorates service quality of the terminal device 20.

Based on the schematic architecture diagram of the network system in FIG. 1, this application provides a measurement method. This can help a first device determine a situation of a second device, reduce frequent occupancy of a time domain resource by the measurement gap when the second device has no to-be-handed-over measurement object, and save uplink and downlink time domain resources of the second device, thereby improving service quality of the second device when channel quality of all measurement objects is poor.

A main inventive principle in this application may include: When sending, to a second device, a second gap configuration and a first event configuration that are used for measurement, a first device may simultaneously or sequentially send a time parameter configuration (for example, a timer) to the second device, and configure, by using the time parameter configuration, a time at which the first device sends a first gap configuration to the second device, or configure, by using the time parameter configuration, a time at which the second device sends a first measurement message for measurement to the first device.

If the second device detects no to-be-handed-over measurement object at a time point or within a time period indicated by the time parameter configuration, the first device may send the first gap configuration to the second device again based on the first measurement message or the time parameter configuration. The first gap configuration is different from the second gap configuration. Compared with the second gap configuration, the first gap configuration may be one or more of a longer measurement gap repetition period, a longer measurement gap repetition period within a sixth time, a longer measurement gap burst repetition period, a longer measurement gap burst repetition period within a seventh time, a shorter measurement gap length, a shorter measurement gap length within an eighth time, a smaller quantity of repeated measurement gaps per burst, a smaller quantity of repeated measurement gaps per burst within a ninth time, canceling the first measurement gap configuration, and canceling the second gap configuration within a tenth time. One or more of the gap configurations reconfigured by the first device 10 for the second device 20 can be used to reduce occupancy of a time domain resource for communication of the second device by a measurement gap, and reduce a time spent by the second device on data transmission, thereby improving service quality of the second device.

For example, the first device is a network device and the second device is a terminal device.

Figure 4:
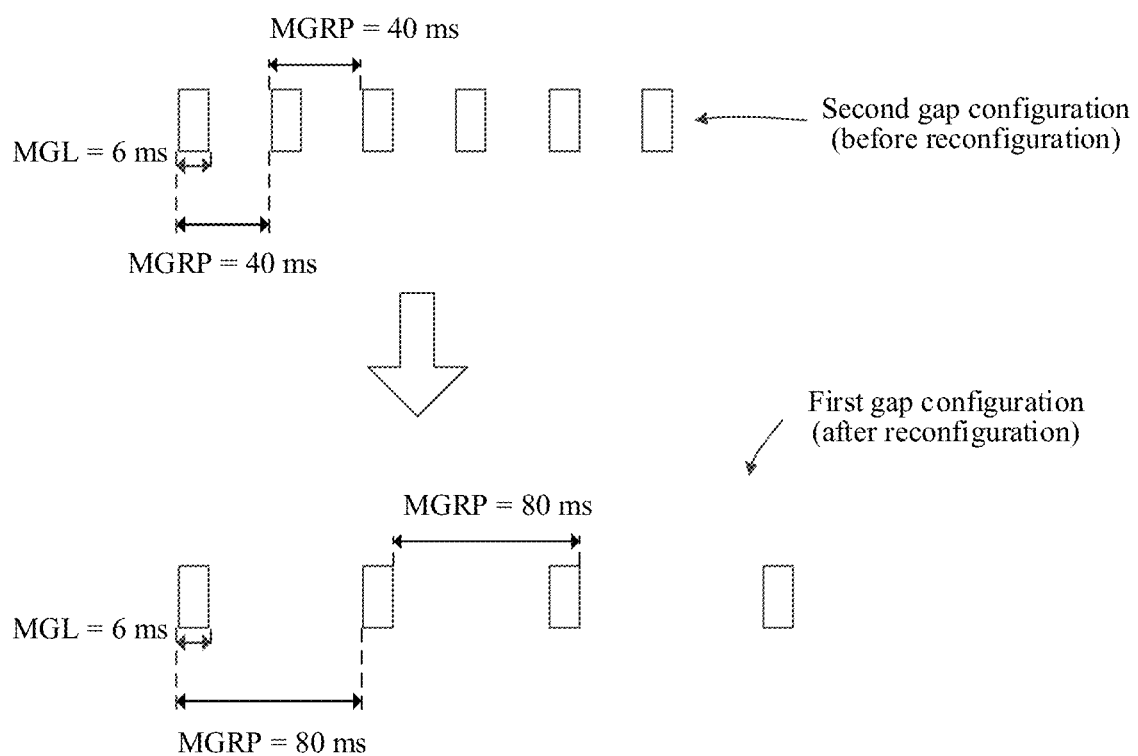
FIG. 4 is a schematic diagram of a reconfigured gap configuration according to an embodiment of this application.

(1) Longer Measurement Gap Repetition Period or the Longer Measurement Gap Repetition Period within the Sixth Time FIG. 4 is a schematic diagram of a reconfigured gap configuration according to an embodiment of this application. As shown in FIG. 4, the second gap configuration configured by the network device for the terminal device is as follows: MGRP=40 ms and MGL=6 ms, and is a uniform measurement gap. In other words, the terminal device performs one measurement every 40 ms, a length of each measurement gap is 6 ms, and the terminal device cannot exchange any data with the network device within 6 ms. The reconfigured first gap configuration is as follows: MGRP=80 ms and MGL=6 ms, or MGRP=80 ms and MGL=6 ms within the sixth time. The measurement gap repetition period changes from 40 ms to 80 ms, as shown in FIG. 4. This can reduce a frequency of occupying uplink and downlink time domain resources of the terminal device by the measurement gap, and reduce a time spent by the terminal device on data transmission, thereby improving service quality of the terminal device.

The longer measurement gap repetition period within the sixth time indicates that the terminal device performs the measurement by using the first gap configuration within the sixth time, including: MGRP=80 ms and MGL=6 ms. The terminal device may no longer perform the measurement within the measurement gap when the sixth time expires. The terminal device may alternatively restore the second gap configuration when the sixth time expires. The terminal device may further perform an operation based on a configuration of the network device after the sixth time expires. This is not limited in this application.

Figure 5:
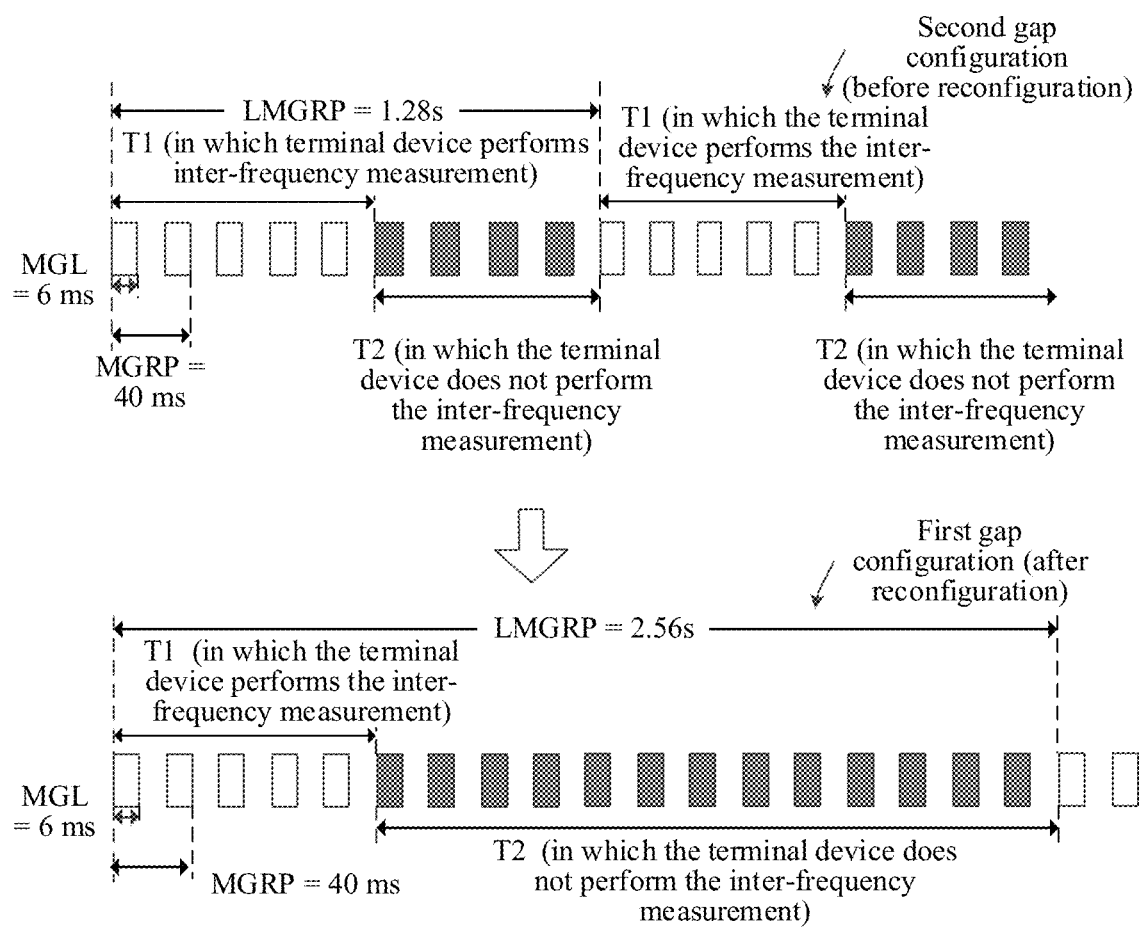
FIG. 5 is a schematic diagram of another reconfigured gap configuration according to an embodiment of this application.

(2) Longer Measurement Gap Burst Repetition Period or the Longer Measurement Gap Burst Repetition Period within the Seventh Time FIG. 5 is a schematic diagram of another reconfigured gap configuration according to an embodiment of this application. As shown in FIG. 5, the second gap configuration configured by the network device for the terminal device is as follows: MGRP=40 ms, MGL=6 ms, and LMGRP=1.28 s. The reconfigured first gap configuration is as follows: MGRP=40 ms, MGL=6 ms, and LMGRP=2.56 s. Alternatively, the first gap configuration is as follows: MGRP=40 ms, MGL=6 ms, and LMGRP=2.56 s within the seventh time. The LMGRP changes from 1.28 s to 2.56 s, as shown in FIG. 5, and a time (T2) in which the terminal device does not perform the inter-frequency measurement is prolonged. This can reduce a frequency of occupying uplink and downlink time domain resources of the network device by the measurement gap, and reduce a time spent by the terminal device on data transmission, thereby improving service quality of the terminal device.

The longer measurement gap burst repetition period within the seventh time indicates that the terminal device performs the measurement within the measurement gap by using the first gap configuration within the seventh time, including: MGRP=40 ms, MGL=6 ms, and LMGRP=2.56 s. The terminal device may no longer perform the measurement within the measurement gap when the seventh time expires. The terminal device may alternatively restore the second gap configuration when the seventh time expires. The terminal device may further perform an operation based on a configuration of the network device after the sixth time expires. This is not limited in this application.

Figure 6:
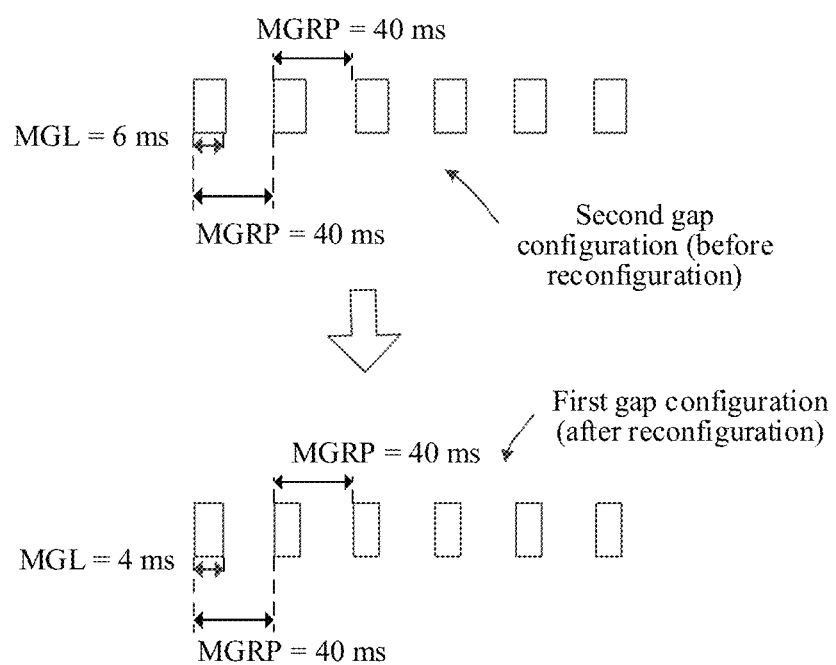
FIG. 6 is a schematic diagram of still another reconfigured gap configuration according to an embodiment of this application.

(3) Shorter Measurement Gap Length or the Shorter Measurement Gap Length within the Eighth Time FIG. 6 is a schematic diagram of still another reconfigured gap configuration according to an embodiment of this application. As shown in FIG. 6, the second gap configuration configured by the network device for the terminal device is as follows: MGRP=40 ms and MGL=6 ms, and is a uniform measurement gap. In other words, the terminal device performs one measurement every 40 ms, a length of each measurement gap is 6 ms, and the terminal device cannot exchange any data with the network device within 6 ms. The reconfigured first gap configuration is as follows: MGRP=40 ms and MGL=4 ms. Alternatively, the first gap configuration is as follows: MGRP=40 ms and MGL=4 ms within the eighth time. As shown in FIG. 6, the measurement gap length changes from 6 ms to 4 ms. This can reduce occupancy of uplink and downlink time domain resources of the network device by the measurement gap, and reduce a time spent by the terminal device on data transmission, thereby improving service quality of the terminal device.

The shorter measurement gap length within the eighth time indicates that the terminal device performs the measurement within the measurement gap by using the first gap configuration with the eighth time, including: MGRP=40 ms and MGL=4 ms. The terminal device may no longer perform the measurement within the measurement gap when the eighth time expires. The terminal device may alternatively restore the second gap configuration when the eighth time expires. The terminal device may further perform an operation based on a configuration of the network device after the eighth time expires. This is not limited in this application.

Figure 7:
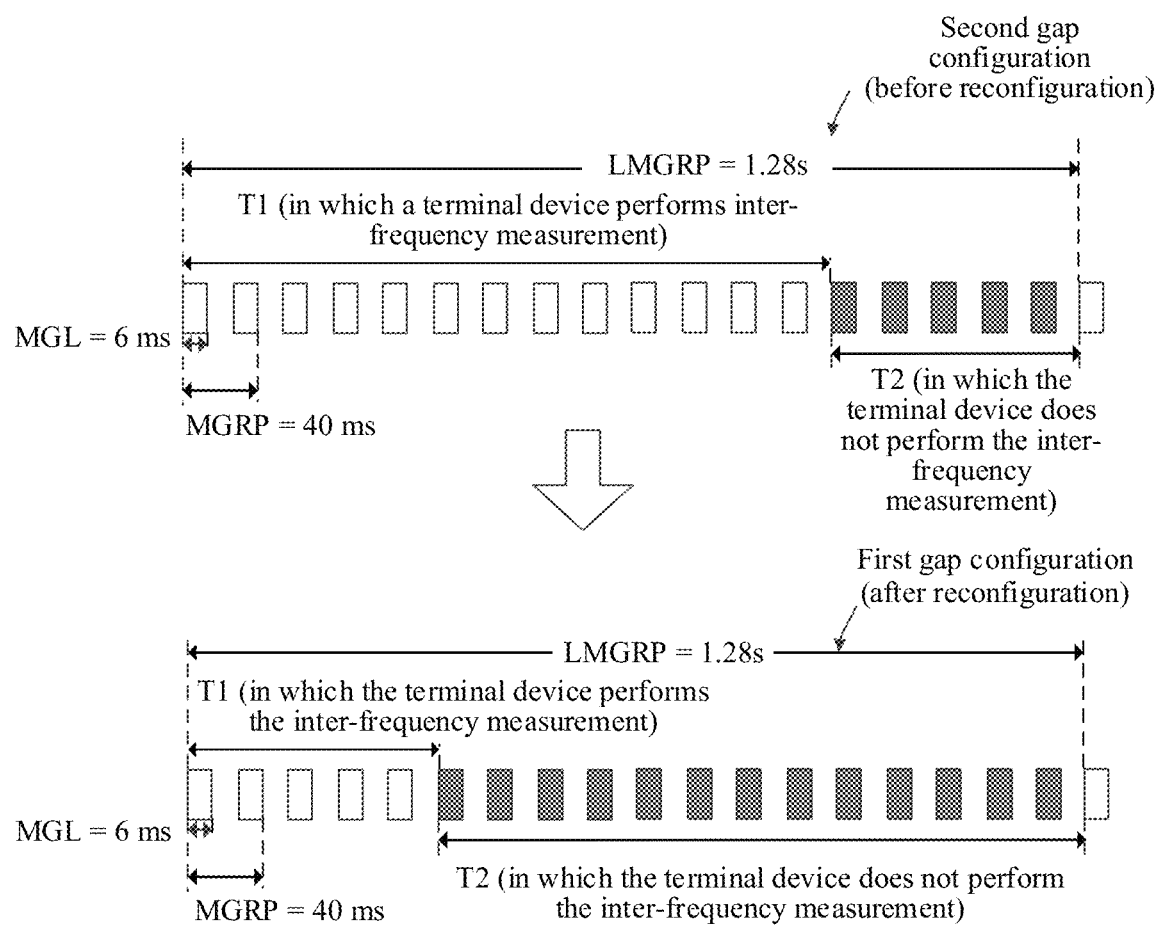
FIG. 7 is a schematic diagram of yet another reconfigured gap configuration according to an embodiment of this application.

(4) Smaller Quantity of Repeated Measurement Gaps Per Burst or the Smaller Quantity of Repeated Measurement Gaps Per Burst within the Ninth Time FIG. 7 is a schematic diagram of yet another reconfigured gap configuration according to an embodiment of this application. As shown in FIG. 7, the second gap configuration configured by the network device for the terminal device is as follows: MGRP=40 ms, MGL=6 ms, and LMGRP=1.28 s, and a quantity of repeated measurement gaps per burst is 13. The reconfigured first gap configuration is as follows: MGRP=40 ms, MGL=6 ms, and LMGRP=1.28 s, and a quantity of repeated measurement gaps per burst is 5. Alternatively, the first gap configuration includes: within the ninth time, MGRP=40 ms, MGL=6 ms, LMGRP=1.28 s, and a quantity of repeated measurement gaps per burst is 5. As shown in FIG. 7, the quantity of repeated measurement gaps per burst changes from 13 to 5. This can reduce occupancy of uplink and downlink time domain resources of the network device by the measurement gap, and reduce a time spent by the terminal device on data transmission, thereby improving service quality of the terminal device.

The smaller quantity of repeated measurement gaps per burst within the ninth time indicates that the terminal device performs the measurement within the measurement gap by using the first gap configuration within the ninth time, including: MGRP=40 ms, MGL=6 ms, LMGRP=1.28 s, and the quantity of repeated measurement gaps per burst is 10. The terminal device may no longer perform the measurement within the measurement gap when the ninth time expires. The terminal device may alternatively restore the second gap configuration when the ninth time expires. The terminal device may further perform an operation based on a configuration of the network device after the ninth time expires. This is not limited in this application.

(5) Canceling the First Measurement Gap Configuration or Canceling the Second Gap Configuration within the Tenth Time The second gap configuration configured by the network device for the terminal device is as follows: MGRP=40 ms and MGL=6 ms, and is a uniform measurement gap. In other words, the terminal device performs one measurement every 40 ms, a length of each measurement gap is 6 ms, and the terminal device cannot exchange any data with the network device within 6 ms. The reconfigured first gap configuration is to cancel the first measurement gap configuration. Alternatively, the first gap configuration is to cancel the first measurement gap configuration within the tenth time. Canceling the first measurement gap configuration indicates that the measurement within the measurement gap is not performed. This can reduce a frequency of occupying uplink and downlink time domain resources of the network device by the measurement gap, and reduce a time spent by the terminal device on data transmission, thereby improving service quality of the terminal device.

Canceling the first measurement gap configuration in the tenth time indicates that the terminal device cancels the first measurement gap configuration within the tenth time, that is, does not perform the measurement within the measurement gap. The terminal device may no longer perform the measurement within the measurement gap when the tenth time expires. The terminal device may alternatively restore the second gap configuration when the tenth time expires. The terminal device may further perform an operation based on a configuration of the network device after the tenth time expires. This is not limited in this application.

Based on the foregoing main inventive principle, the following describes several embodiments provided in this application.

Figure 8:
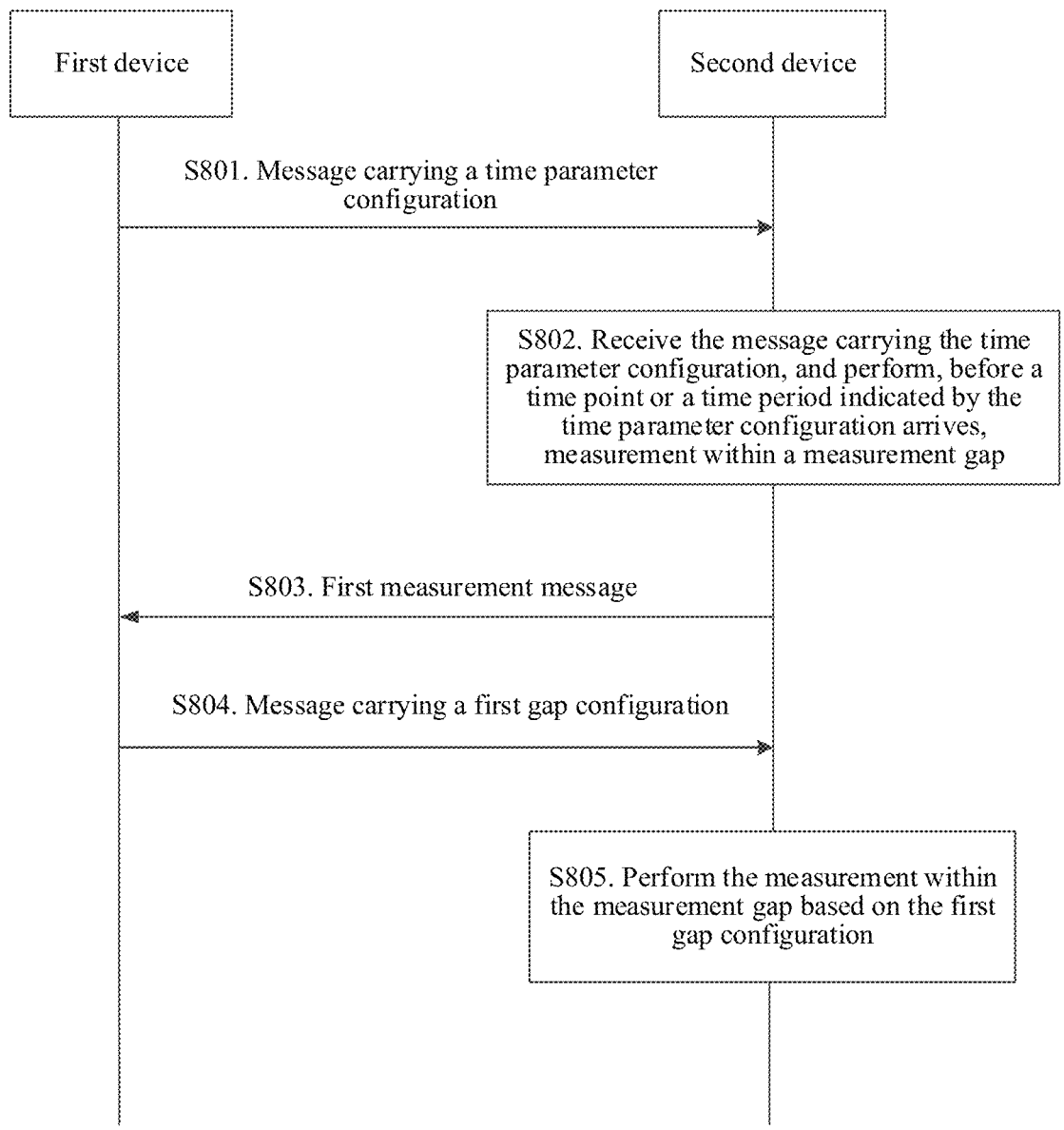
FIG. 8 is a schematic flowchart of a measurement method according to an embodiment of this application.

FIG. 8 is a schematic flowchart of a measurement method according to an embodiment of this application. In the embodiment described in FIG. 8, when a time period in a time parameter configuration expires, a second device sends a first measurement message to a first device, to inform the first device that no to-be-handed-over measurement object is detected. The first device reconfigures a first gap configuration for the second device based on the first measurement message.

As shown in FIG. 8, the measurement method includes but is not limited to the following steps S801 to S806.

S801. The first device sends, to the second device, a message carrying a time parameter configuration.

In this embodiment of this application, the time parameter configuration is used to configure a time at which the second device sends a first measurement message for measurement. A time in the time parameter configuration may be a time point corresponding to the time parameter configuration, or within a time period in the time parameter configuration, or a time point obtained by increasing the time in the time parameter configuration by a first increment, or within a time period obtained by increasing the time in the time parameter configuration by a second increment, and is referred to as a time point or a time period indicated by the time parameter configuration below.

Specifically, the time parameter configuration may be configuration information of a timer configured by the first device for the second device. Alternatively, the time parameter configuration may be a system time of the first device or a system time of the second device. Alternatively, the time parameter configuration may be a system frame number of the first device or a range of system frame numbers of the first device. Duration in the time parameter configuration may represent duration for which no to-be-handed-over target measurement cell is detected and that the second device can tolerate. If the second device detects no to-be-handed-over measurement object when the time period in the time parameter configuration expires, it indicates that the second device detects no to-be-handed-over measurement object for a period of time. The duration in the time parameter configuration is duration between a time at which the second device starts to perform measurement within a measurement gap and the time point (or the time period) indicated by the time parameter configuration. For example, when the time parameter configuration is a timer, duration in the time parameter configuration is duration from a time at which the second device starts to perform measurement within a measurement gap to a time at which a timing of the timer arrives.

In this embodiment of this application, the first device may further send a second gap configuration and a first event configuration to the second device. Any two or three of the second gap configuration, the first event configuration, and the time parameter configuration may be carried in one message and delivered to the second device, or may be added by the first device to different messages twice or three times and delivered to the second device. The first device may deliver the time parameter configuration when the second device has performed the measurement within the measurement gap, or when the first device is going to configure the measurement gap for the second device, that is, when the second gap configuration and the first event configuration are configured. This is not limited in this application. The second gap configuration and the first event configuration are described in detail below.

The second gap configuration is used to configure a time resource used by the second device to perform measurement. The second gap configuration and a first gap configuration that is mentioned below may include a configuration of one or more of parameters: an MGRP, an LMGRP, an MGL, and a quantity of repeated measurement gaps per burst. The second device performs the measurement within measurement gap on a corresponding time resource based on the configuration of one or more of the parameters. The second gap configuration may be understood as a gap configuration first configured by the first device for the second device. The first gap configuration may be a gap configuration reconfigured by the first device for the second device when the first device learns that the first device detects no to-be-handed-over measurement object. For example, the second gap configuration configured for the second device is a uniform gap configuration, and is as follows: MGRP=40 ms and MGL=6 ms, and the first gap configuration configured for the second device is a non-uniform gap configuration, and is as follows: MGRP=40 ms, MGL=6 ms, and LMGRP=1.28 s.

The first event configuration is used to configure an event used to trigger the second device to send a second measurement message for the measurement. The first event configuration may be configured by using an identifier of a measurement event. When a trigger condition of a first event is triggered, the second device reports the second measurement message to the first device. The second measurement message may include an identifier used to identify current measurement, a measurement result (channel quality and the like) of a serving cell, and a measurement result (channel quality and the like) of a target measurement cell. Specifically, the first event configuration may be an A3 event. To be specific, when detecting that a trigger condition of the A3 event is met, the second device is triggered to report the second measurement message to the first device. In addition, the trigger condition of the first event may alternatively be a condition of another event used to determine that the second device detects a to-be-handed-over measurement object, such as one or more of an A5 event, a B1 event, and the like, or may be a condition of a newly defined measurement event in the future. When the time point or the time period indicated by the time parameter configuration expires, the condition of the first event configuration is not triggered, and the second device does not send the second measurement message to the first device. It indicates that the second device detects no to-be-handed-over measurement object. In this case, the second device sends the first measurement message to the first device.

The channel quality may be represented by using one or more of the following parameters: a reference signal received power (reference Signal receiving power, RSRP), reference signal received quality (reference signal receiving quality, RSRQ), and a received signal strength indicator (received signal strength indication, RSSI). The channel quality may further include another parameter that represents strength of a signal communicated by the second device with the first device. This is not limited in this embodiment of this application.

S802. The second device receives the message carrying the time parameter configuration, performs, before the time point or the time period indicated by the time parameter configuration arrives, the measurement within the measurement gap, and performs step S803 if the second device detects a to-be-handed-over measurement object.

In this embodiment of this application, the second device may perform, before the time point or the time period indicated by the time parameter configuration arrives, the measurement within the measurement gap based on the received second gap configuration and first event configuration, to detect whether there is a to-be-handed-over measurement object. Specifically, the second device detects, on the time resource provided in the second gap configuration, whether the measurement object meets the trigger condition of the first event configuration. For example, the second gap configuration is as follows: MGRP=40 ms and MGL=6 ms, and is a uniform measurement gap; and the first event configuration is the A3 event. In this case, the second device detects, within the defined MGL every 40 ms, whether channel quality of the measurement object is a specific threshold greater than channel quality of a current serving cell. If the A3 event is triggered, the second device sends a measurement report to the first device. If the A3 event is not triggered, the second device does not report any measurement report, and continues to perform the measurement within a next MGL of 40 ms.

S803. When the time point or the time period indicated by the time parameter configuration expires, the second device sends the first measurement message for the measurement to the first device.

In this embodiment of this application, if the second device is not triggered to send the second measurement message to the first device because the condition of the first event configuration is still not triggered at the time point in the time parameter configuration, or within the time period in the time parameter configuration, or at the time point obtained by increasing the time in the time parameter configuration by the first increment, or within the time period obtained by increasing the time in the time parameter configuration by the second increment, the first measurement message is sent by the second device to the first device.

The first measurement message may include or indicate at least one of the following information: the channel quality of the measurement object, an identifier of the measurement object, information used to indicate that the second device detects no to-be-handed-over measurement object, and a measurement gap configuration expected by the second device. The measurement gap configuration expected by the second device includes any one or more of the following: a measurement gap repetition period expected by the second device, a measurement gap repetition period that is within a first time and that is expected by the second device, a measurement gap burst repetition period expected by the second device, a measurement gap burst repetition period that is within a second time and that is expected by the second device, a measurement gap length expected by the second device, a measurement gap length that is within a third time and that is expected by the second device, a quantity of repeated measurement gaps per burst that is expected by the second device, a quantity of repeated measurement gaps per burst that is within a fourth time and that is expected by the second device, that the second device expects to cancel the second gap configuration, and that the second device expects to cancel the second gap configuration within a fifth time.

Specifically, when the time parameter configuration is the configuration information of the timer configured by the first device for the second device, the timer indicates the time at which the second device sends the first measurement message. If the second device is not triggered to send the second measurement message to the first device because the condition of the first event configuration is still not triggered when a moment specified by the timer arrives, the second device sends the first measurement message to the first device. Alternatively, if the second device is not triggered to send the second measurement message to the first device because the condition of the first event configuration is still not triggered within a period of time before a moment specified by the timer arrives, the second device sends the first measurement message to the first device. Alternatively, if the second device is not triggered to send the second measurement message to the first device because the condition of the first event configuration is still not triggered when a moment obtained by increasing a timing of the timer by the first increment arrives, the second device sends the first measurement message to the first device. Alternatively, if the second device is not triggered to send the second measurement message to the first device because the condition of the first event configuration is still not triggered within a period of time before a moment obtained by increasing a timing of the timer by the second increment arrives, the second device sends the first measurement message to the first device. Both the first increment and the second increment may be positive numbers, negative numbers, or 0. This is not limited in this application.

Because there is a delay for transferring a message between the second device and the first device, after the second device sends the first measurement message to the first device, a difference caused by message transmission needs to be added to a time at which the first device detects and receives the first measurement message at the time point (within the time period) indicated by the time parameter configuration. In addition, a difference between the system time of the first device and the system time of the second device may further be added to the time parameter configuration used by the first device and the second device to detect and receive the message.

In addition, the time parameter configuration may alternatively be the system time of the first device, a range of system times of the first device, the system time of the second device, or a range of system times of the second device. Alternatively, the time parameter configuration may be the system frame number of the first device or the range of system frame numbers of the first device. When the time parameter configuration is the system frame number of the first device or the range of system frame numbers of the first device, the second device receives the system frame number (the range of frame numbers) of the first device. When the system frame number of the first device is the same as a configured system frame number of the first device or is included in a range of configured system frame numbers of the first device, the second device sends the first measurement message. The foregoing specifically describes the time parameter configuration by using the timer as an example. It may be understood that, related descriptions are also applicable to a scenario in which the time parameter configuration is the system time, the range of system times, the system frame number, or the range of system frame numbers. Details are not described herein again.

After the second device receives the configuration from the first device, if the second device detects, within the time in the time parameter configuration, that the condition of the first event configuration is triggered, the second device may send the second measurement message corresponding to the first event to the first device, to inform the first device of related information of the detected to-be-handed-over target measurement cell. The first device determines, based on the received related information of the to-be-handed-over target measurement cell, whether to deliver a cell handover command. In this case, when reporting the second measurement message to the first device, the second device may set the time in time parameter configuration to be invalid.

In this embodiment of this application, the first device may simultaneously send a message carrying one or more of the first gap configuration, the first event configuration, and the time parameter configuration to one or more second devices in measurement objects through broadcasting, that is, configure the message for all of the second devices in the measurement objects. In addition, the first device may alternatively configure the message for each of the second devices based on a specific situation of each second device, that is, configure, for each of the second devices in the measurement objects, a customized message carrying one or more of the first gap configuration, the first event configuration, and the time parameter configuration.

In addition, the time parameter configuration is not limited to the foregoing manners. In a future communications system or communication protocol, the time parameter configuration may alternatively be learned by the second device without being delivered by the first device. For example, the time parameter configuration may be protocol-defined, and the second device may determine the time parameter configuration according to a protocol. For another example, the time parameter configuration may be prestored inside the second device. A manner of obtaining the time parameter configuration is not limited in this application.

S804. The first device sends, to the second device, a message carrying the first gap configuration.

In this embodiment of this application, after receiving the first measurement message, the first device may determine the first gap configuration based on the first measurement message. The first gap configuration is different from the second gap configuration. Specifically, at least one of the following differences may be included: A measurement gap repetition period in the first gap configuration is greater than a measurement gap repetition period in the second gap configuration, a measurement gap repetition period in the first gap configuration is greater than a measurement gap repetition period in the second gap configuration within a sixth time, a measurement gap length in the first gap configuration is less than a measurement gap length in the second gap configuration, a measurement gap length in the first gap configuration is less than a measurement gap length in the second gap configuration within a seventh time, a measurement gap burst repetition period in the first gap configuration is greater than a measurement gap burst repetition period in the second gap configuration, a measurement gap burst repetition period in the first gap configuration is greater than a measurement gap burst repetition period in the second gap configuration within an eighth time, a quantity of repeated measurement gaps per burst in the first gap configuration is less than a quantity of repeated measurement gaps per burst in the second gap configuration, a quantity of repeated measurement gaps per burst in the first gap configuration is less than a quantity of repeated measurement gaps per burst in the second gap configuration within a ninth time, the first gap configuration is to cancel the second gap configuration, and the first gap configuration indicates that the second device cancels the second gap configuration within a tenth time.

It may be understood that, when the first measurement message includes the measurement gap configuration expected by the second device, the second device essentially considers by default that no to-be-handed-over measurement object is detected in a measurement process, and sets the expected measurement gap configuration as required. The result that no to-be-handed-over measurement object is detected in the measurement process may be determined by the terminal device based on a measurement result, or may be determined by the network device based on the first measurement message reported by the terminal device. When there are a plurality of measurement objects included in the first measurement message, the first measurement message may include measurement results (for example, channel quality) of the plurality of measurement objects, or may include identifiers of the plurality of measurement objects. The second gap configuration reconfigured by the first device may be configured based on the measurement gap configuration expected by the second device, or may be determined by the first device based on channel quality of the measurement objects that is reported by the second device and/or based on the identifiers of the measurement objects, or may be determined by the first device based on the measurement gap configuration expected by the second device and information about the measurement objects. This is not limited in this application.

For example, the first measurement message reported by the second device may include: (1) the channel quality of the measurement objects, including: An RSRP1 value of channel quality of a measurement object A is 6 dB and an RSRP2 value of channel quality of a measurement object B is 8 dB; (2) a parameter of the measurement gap expected by the second device is a non-uniform measurement gap, and is as follows: MGRP=40 ms, LMGRP=2.56 s, and MGL=6 ms. (1) in the first measurement message is used by the first device to determine whether the second device detects a to-be-handed-over measurement object. (2) in the first measurement message is the measurement gap configuration expected by the second device that is used to determine that the second device has no to-be-handed-over measurement object. After receiving the first measurement message, the first device may accept a result of the determining by the second device (there is no to-be-handed-over measurement object), and accept a requirement (the expected measurement gap configuration) of the second device. The first measurement gap configuration reconfigured for the first device is a non-uniform measurement gap, and is as follows: MGRP=40 ms, LMGRP=2.56 s, and MGL=6 ms. Alternatively, the first device may not accept a result of the determining by the second device and the expected measurement gap configuration of the second device, and directly determine, based on (1) in the first measurement message, a measurement gap configuration reconfigured for the second device. The measurement gap configuration reconfigured for the second device (the first gap configuration) is a non-uniform measurement gap, and is as follows: MGRP=80 ms, LMGRP=1.28 s, and MGL=6 ms. Alternatively, the first device may use a result of the determining by the second device and the expected measurement gap configuration of the second device as reference, and determine, based on (1) in the first measurement message, that a measurement gap configuration reconfigured for the terminal device (the first gap configuration) is a non-uniform measurement gap, and is as follows: MGRP=40 ms, LMGRP=1.28 s, and MGL=6 ms.

S805. The second device receives the message carrying the first gap configuration, and performs the measurement within the measurement gap based on the first gap configuration.

In this embodiment of this application, the second device may perform the measurement within the measurement gap based on the received reconfigured first gap configuration and the previously received first event configuration, to detect whether there is a to-be-handed-over measurement object. Specifically, the second device detects, on a time resource provided in the first gap configuration, whether the measurement object meets the trigger condition of the first event configuration. For example, the first gap configuration is as follows: MGRP=80 ms and MGL=6 ms, and the first event configuration is the A3 event. In this case, the second device detects, within a defined MGL every 80 ms, whether the channel quality of the measurement object is a specific threshold greater than the channel quality of the current serving cell. If the A3 event is triggered, the second device sends a measurement report to the first device. If the A3 event is not triggered, the second device does not report any measurement report, and continues to perform the detection within a next MGL of 80 ms.

Figure 9:
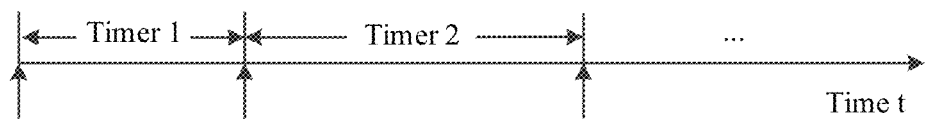
FIG. 9 is a schematic diagram of a measurement gap configuration method according to an embodiment of this application.

In this embodiment of this application, there may be one or more time parameter configurations. After step S804, the first device may send another time parameter configuration to the second device, and perform step S801 by using the another time parameter configuration. Specifically, for example, the time parameter configuration is a timer (timer). FIG. 9 is a schematic diagram of a measurement gap configuration method according to an embodiment of this application. As shown in FIG. 9, the first device first sends a message carrying a timer (sending only a timer 1 or sending both a timer 1 and a timer 2) to the second device, and sends a message carrying the second gap configuration and the first event configuration to the second device. The second gap configuration may be a uniform measurement gap, and may be as follows: MGL=6 ms and MGRP=40 ms. The second device performs the measurement within the measurement gap based on the second gap configuration and the first event configuration, to measure whether there is a to-be-handed-over measurement object.

If the first device does not receive, when a time point or a time period specified by the timer 1 expires, the second measurement message sent by the second device, that is, detects no to-be-handed-over measurement object, the first device sends the message carrying the first gap configuration to the second device. As shown in FIG. 9, the first gap configuration may be a uniform measurement gap, and may be as follows: MGL=6 ms and MGRP=80 ms. The second device performs the measurement based on the first gap configuration and the first event configuration, to measure whether there is a to-be-handed-over measurement object. The first device starts the timer 2, and a timing of the timer 2 may be longer than a timing of the timer 1. If the first device does not receive, when a time point or a time period specified by the timer 2 expires, a measurement message sent by the second device (a measurement message reported by the second device to the first device after the first event configuration is triggered), it indicates that the second device detects no to-be-handed-over measurement object. In this case, the first device sends a message carrying a third gap configuration to the second device. Compared with the first gap configuration, the third gap configuration may be one or more of a longer measurement gap repetition period, a longer measurement gap burst repetition period, a shorter measurement gap length, and a smaller quantity of repeated measurement gaps per burst. As shown in FIG. 9, the third gap configuration may be a non-uniform measurement gap, and may be as follows: MGL=6 ms, MGRP=40 ms, and LMGRP=1.28 s.

A plurality of timers (the timer 1 and the timer 2) may be added by the first device to one message and sent to the second device, for example, sent by the first device to the second device when the second gap configuration and the first event configuration are delivered. Then, the first device sequentially starts the plurality of timers. As shown in FIG. 9, the timer 1 is first started, and then the timer 2 is started when the timer 1 expires. Alternatively, the plurality of timers (the timer 1 and the timer 2) may not be sent simultaneously to the second device. For example, the timer 1 is first sent and started, and then the timer 2 is sent and started when the timer 1 expires.

Figure 10:
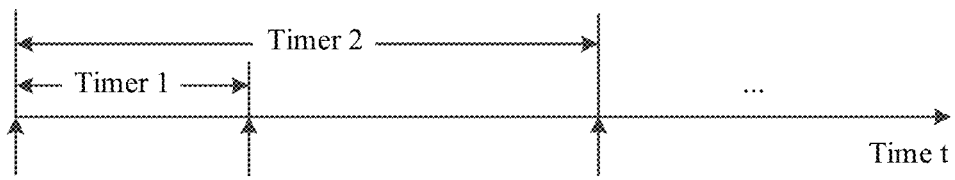
FIG. 10 is a schematic diagram of another measurement gap configuration method according to an embodiment of this application.

Alternatively, the plurality of timers may be sent simultaneously by the first device to the second device and simultaneously started at the first device (or the second device). FIG. 10 is a schematic diagram of another measurement gap configuration method according to an embodiment of this application. As shown in FIG. 10, the timer 1 and the timer 2 may be carried in one message and sent to the second device. For example, when the first device sends the plurality of timers to the second device, the plurality of timers are simultaneously started on the first device side, and timing duration specified by the timer 2 is greater than timing duration specified by the timer 1. If the first device does not receive, when a timing of the timer 1 expires, the second measurement message sent by the second device, the first device sends, to the second device, the message carrying the first gap configuration. The first gap configuration may be a uniform measurement gap, and may be as follows: MGL=6 ms and MGRP=80 ms. If the first device does not receive, when a time point or a time period specified by the timer 2 expires, a measurement message sent by the second device (a measurement message reported by the second device to the first device after a first event configuration is triggered), the first device sends, to the second device, the message carrying the third gap configuration.

When the time parameter configuration is the system time (or the range of system times) or the system frame number (or the range of system frame numbers), the first device may further send a plurality of system times (or ranges of system time ranges) or system frame numbers (or ranges of system frame numbers) to the second device. Similar to the case of the foregoing timer, details are not described herein again.

The following uses an example in which the first device is a network device and the second device is a terminal device for description. When the terminal device detects that channel quality of a serving cell is poor, the terminal device detects that a trigger condition of an A2 event is met, and reports a measurement report corresponding to the A2 event to the network device. The network device determines, based on the measurement report, that the terminal device needs to perform inter-frequency measurement. In this case, the second gap configuration configured for the terminal device includes: a uniform gap configuration, MGRP=40 ms, and MGL=6 ms. Within the MGL (6 ms) of each MGRP (40 ms), the network device is configured to perform the measurement within the measurement gap. The network device may further configure a first event configuration as an A3 event for the terminal device. It indicates that within the MGL (6 ms) of each MGRP (40 ms), the network device is configured to perform the measurement within the measurement gap. Whether to measure and report the second measurement message is determined by determining whether the A3 event is triggered. The network device further sends the time parameter configuration, namely, a timer of 2 minutes, to the terminal device. The timer is used to configure a condition that the terminal device still does not trigger the A3 event within 2 minutes. The terminal device does not send a measurement report (carried in the second measurement message) corresponding to the A3 event to the network device. In this case, the terminal device sends the first measurement message to the network device. The first measurement message may include channel quality of a target measurement cell and channel quality of a serving cell. The network device adds the second gap configuration, the first event configuration, and the time parameter configuration to a message, and sends the message to the terminal device. When receiving the message, the terminal device starts the timer, and performs an A3 event measurement on the target measurement cell on a time resource in the second gap configuration within 2 minutes. Because the terminal device is in a deep fading scenario and channel quality of all surrounding cells is comparatively poor, the A3 event is not triggered within 2 minutes. The terminal device is not triggered to report the second measurement message carrying the measurement report of the A3 event. In this case, the terminal device may send the first measurement message to the network device when the timing of 2 minutes arrives. The network device resets, for the terminal device based on the received first measurement message, the first measurement gap, including: a non-uniform gap configuration, MGRP=40 ms, MGL=6 ms, and LMGRP=1.28 s. When the terminal device is in a deep fading scenario, channel quality of all target measurement cells is poor. When the timing of the timer arrives, the network device receives the first measurement message sent by the terminal device, indicating that the terminal device detects no to-be-handed-over target measurement cell. A measurement gap configuration may be reconfigured for the terminal device. This can reduce frequent occupancy of uplink and downlink time domain resources of the terminal device by the measurement gap, thereby improving service quality of the terminal device.

Figure 11:
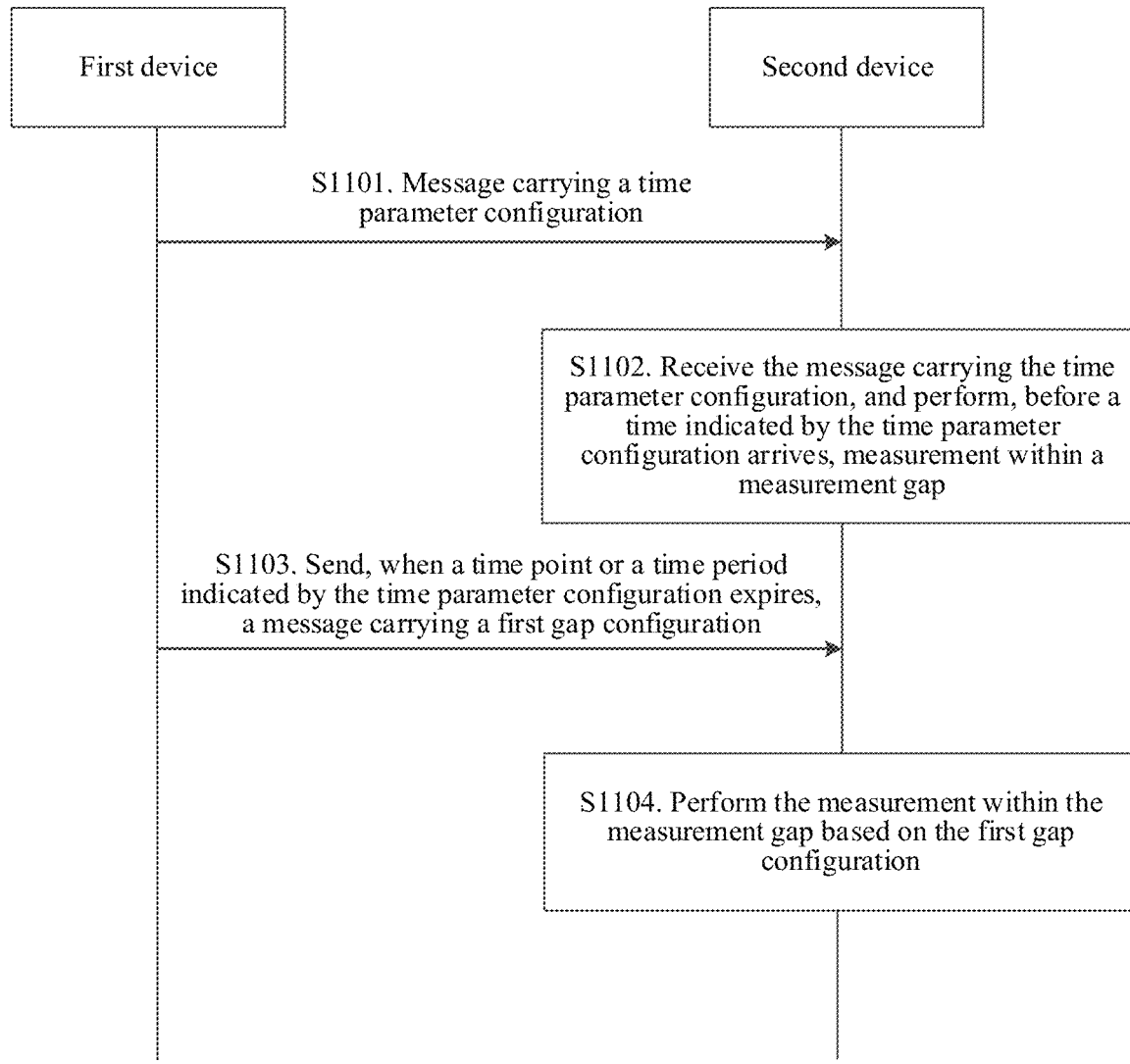
FIG. 11 is a schematic flowchart of another measurement method according to an embodiment of this application.

FIG. 11 is a schematic flowchart of another measurement method according to an embodiment of this application. In the embodiment described in FIG. 11, if a first device still does not receive, when a time or a time period indicated by a time parameter configuration expires, a second measurement message that is sent by a second device and that is used to inform the first device that there is a to-be-handed-over measurement object, the first device reconfigures a first gap configuration for the second device.

As shown in FIG. 11, the measurement method includes but is not limited to the following steps S1101 to S1104.

S1101. The first device sends, to the second device, a message carrying a time parameter configuration.

S1102. The second device receives the message carrying the time parameter configuration, and performs, before a time indicated by the time parameter configuration arrives, measurement within a measurement gap.

S1103. The first device sends, to the second device when a time point or a time period indicated by the time parameter configuration expires, a message carrying a first gap configuration.

S1104. The second device receives the message carrying the first gap configuration, and performs the measurement within the measurement gap based on the first gap configuration.

In this embodiment of this application, for descriptions of steps S1101, S1102, and S1104, refer to steps S801, S802, and S805 in the embodiment described in FIG. 8. Details are not described herein again.

If the first device does not receive a second measurement message sent by the second device, at the time point in the time parameter configuration, or within the time period in the time parameter configuration, or at a time point obtained by increasing the time in the time parameter configuration by a first increment, or within a time period obtained by increasing the time in the time parameter configuration by a second increment, the first device sends, to the second device, the message carrying the first gap configuration. The first gap configuration is different from the second gap configuration. It may be understood that, the first device detects no second measurement message when the time or the time period indicated by the time parameter configuration expires, indicating that the second device has not triggered a trigger condition of a first event configuration for a period of time. In addition, the trigger condition of the first event configuration is that the first device detects a to-be-handed-over measurement object. Therefore, if the first device detects no second measurement message within the time or the time period indicated by the time parameter configuration, the first device determines that there is (or may be) no to-be-handed-over measurement object in measurement objects of the second device. Then, the first device reconfigures the first gap configuration for the second device.

The first gap configuration may be different from the second gap configuration, including at least one of the following: A measurement gap repetition period in the first gap configuration is greater than a measurement gap repetition period in the second gap configuration, a measurement gap repetition period in the first gap configuration is greater than a measurement gap repetition period in the second gap configuration within a sixth time, a measurement gap length in the first gap configuration is less than a measurement gap length in the second gap configuration, a measurement gap length in the first gap configuration is less than a measurement gap length in the second gap configuration within a seventh time, a measurement gap burst repetition period in the first gap configuration is greater than a measurement gap burst repetition period in the second gap configuration, a measurement gap burst repetition period in the first gap configuration is greater than a measurement gap burst repetition period in the second gap configuration within an eighth time, a quantity of repeated measurement gaps per burst in the first gap configuration is less than a quantity of repeated measurement gaps per burst in the second gap configuration, a quantity of repeated measurement gaps per burst in the first gap configuration is less than a quantity of repeated measurement gaps per burst in the second gap configuration within a ninth time, the first gap configuration is to cancel the second gap configuration, and the first gap configuration indicates that the second device cancels the second gap configuration within a tenth time.

For example, the time parameter configuration that may be configured by the first device for the second device is a timer with a timing of 1 minute. The second gap configuration that may further be configured by the first device for the second device is as follows: MGRP=40 ms and MGL=6 ms, and is a uniform measurement gap. In other words, the second device performs one measurement every 40 ms, a length of each measurement gap is 6 ms, and the second device cannot exchange any data with the first device within 6 ms. The first event configuration configured by the first device for the second device may be that an A3 event triggers the second device to report the second measurement message to the first device. If the first device detects, when the timing of the timer expires, no second measurement message sent by the second device, the first device may send, to the second device, the message carrying the first gap configuration. The first gap configuration is as follows: MGRP=80 ms, MGL=6 ms, and LMGRP=1.28 s, and is a non-uniform measurement gap.

When the timing of 1 minute of the timer expires, channel quality of all target measurement cells that is measured by the second device may be poor. As a result, the first event configuration is not triggered, and the first device does not receive the second measurement message from the second device. After reconfiguring the first gap configuration, the MGRP changes from 40 ms to 80 ms, and a frequency of occupying uplink and downlink time domain resources of the second device by the MGL is reduced. The measurement gap changes from the uniform measurement gap to the non-uniform measurement gap. Within a time period T2 of the LMGRP, the second device does not perform the measurement within the measurement gap. Compared with the uniform measurement gap, the non-uniform measurement gap generates more time in which there is no measurement gap. In this way, the frequency of occupying the uplink and downlink time domain resources of the second device by the measurement gap length can be reduced. In addition, reconfiguring the first gap configuration may alternatively be canceling the measurement gap.

The reconfigured first gap configuration may include: within a specific time, for example, within the sixth time, the measurement gap repetition period in the first gap configuration is greater than the measurement gap repetition period in the second gap configuration; within the seventh time, the measurement gap length in the first gap configuration is less than the measurement gap length in the second gap configuration; within the eighth time, the measurement gap burst repetition period in the first gap configuration is greater than the measurement gap burst repetition period in the second gap configuration; within the ninth time, a quantity of repeated measurement gaps per burst in the first gap configuration is less than the quantity of repeated measurement gaps per burst in the second gap configuration; and within the tenth time, the first gap configuration indicates that the second device cancels the second gap configuration.

After receiving the reconfigured first gap configuration sent by the first device, the second device performs the measurement within the measurement gap based on the parameters in the reconfigured first gap configuration, and detects whether there is a to-be-handed-over measurement object. When channel quality of all measurement objects is poor, the reconfigured first gap configuration can be used to reduce frequent occupancy of uplink and downlink time domain resources of the second device by the measurement gap, thereby improving service quality of the second device.

Figure 12:
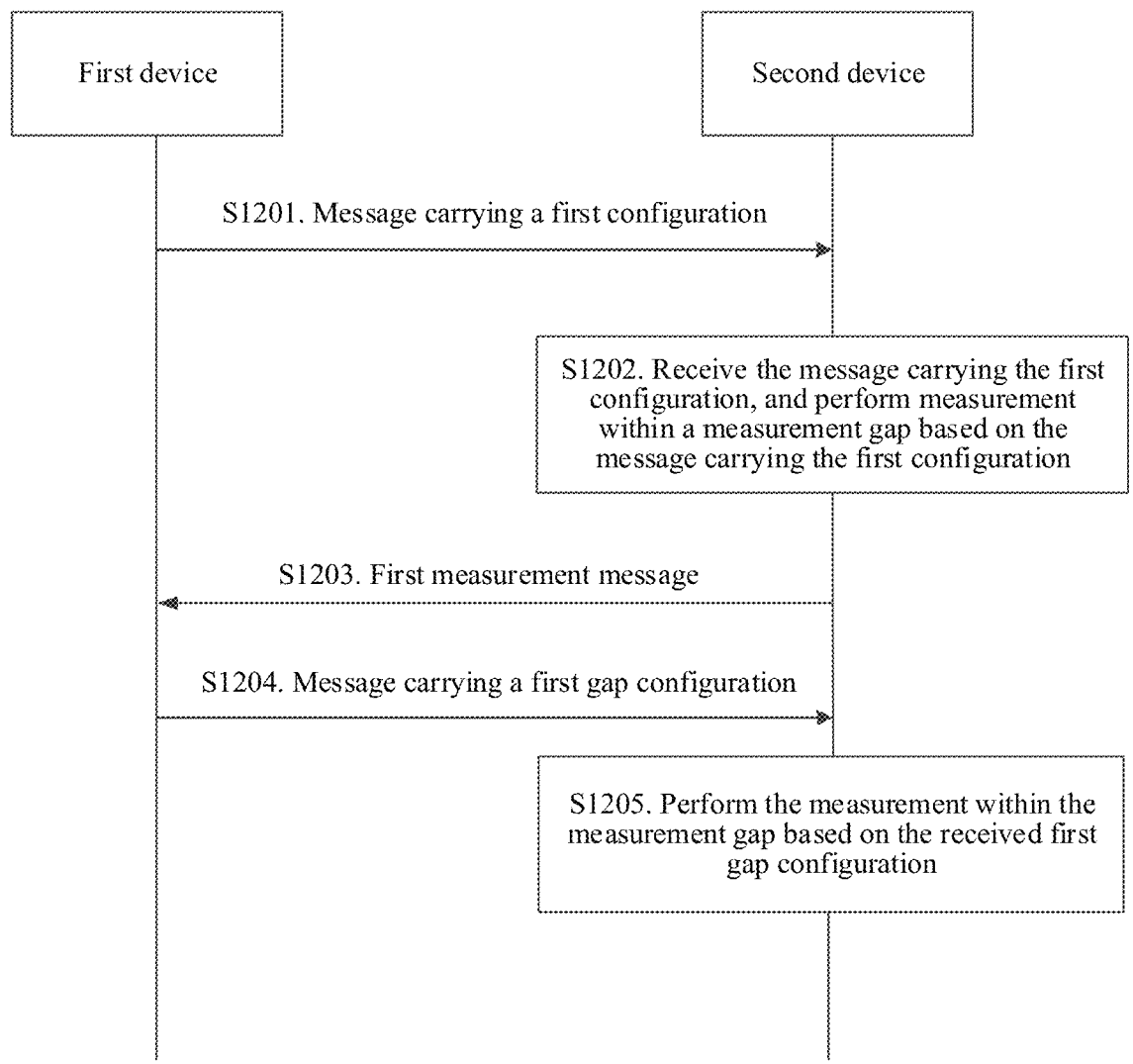
FIG. 12 is a schematic flowchart of still another measurement method according to an embodiment of this application.

FIG. 12 is a schematic flowchart of still another measurement method according to an embodiment of this application. In the embodiment described in FIG. 12, a first device configures a first event used to detect that channel quality of all measurement objects is poor; a second device detects, based on the newly configured first event, whether the channel quality of all the measurement objects is poor, and if the channel quality of all the measurement objects is poor, reports a first measurement message to the first device; and the first device configures a first gap configuration for the second device based on the first measurement message. The first gap configuration is different from a second gap configuration used when a first event configuration is performed.

As shown in FIG. 12, the measurement method includes but is not limited to the following steps S1201 to S1205.

S1201. The first device sends, to the second device, a message carrying a first configuration.

In this embodiment of this application, the first configuration is used to indicate that a first event is used to trigger the second device to send a first measurement message for measurement. The first event includes at least one of the following: Channel quality of a measurement object is less than a first threshold, the channel quality of the measurement object is lower than channel quality of a serving cell of the second device, the channel quality of the measurement object is less than the first threshold and the channel quality of the serving cell of the second device is greater than a second threshold, and the channel quality of the measurement object is lower than the channel quality of the serving cell of the second device and the channel quality of the serving cell of the second device is greater than the second threshold. When detecting that a trigger condition of any one of more of the foregoing first events is met, the second device may send a measurement report to the first device. The measurement report may be carried in the first measurement message and sent to the first device.

The trigger condition of the first event may be any one or more of the foregoing, and may specifically be determined based on the first configuration configured by the first device for the second device. For example, the first configuration is that the channel quality of the measurement object is less than the first threshold and the channel quality of the measurement object is lower than the channel quality of the serving cell of the second device. In this case, the second device detects that the channel quality of the measurement object is less than the first threshold and the channel quality of the measurement object is lower than the channel quality of the serving cell of the second device, and then sends the first measurement message to the first device. For another example, the first configuration is that the channel quality of the measurement object is less than the first threshold and the channel quality of the serving cell of the second device is greater than the second threshold. In this case, the second device detects that the channel quality of the measurement object is less than the first threshold and the channel quality of the serving cell of the second device is greater than the second threshold, and then sends the first measurement message to the first device. The first event may be predefined. For example, the first event is protocol-defined. It may be understood that the foregoing example is merely used to explain this embodiment of this application, and should not be construed as any limitation.

That the channel quality of the measurement object is less than the first threshold may include: The channel quality of the measurement object is less than a third threshold, or the channel quality of the measurement object is less than a sum of a third threshold and a first offset. That the channel quality of the measurement object is lower than the channel quality of the serving cell of the second device may include: The channel quality of the measurement object is lower than the channel quality of the serving cell of the second device, or the channel quality of the measurement object is less than a sum of the channel quality of the serving cell of the second device and a second offset. That the channel quality of the serving cell of the second device is greater than a second threshold may include: The channel quality of the serving cell of the second device is greater than a fourth threshold, or the channel quality of the serving cell of the second device is greater than a sum of a fourth threshold and a third offset.

"Lower than" may be understood as "less than or equal to", and "lower than" may be "always lower than within a preset timer". The first offset, the second offset, and the third offset may be all positive numbers, negative numbers, or 0. This is not limited in this application. The first threshold may be the third threshold, or may be the sum of the third threshold and the first offset. The second threshold may be the fourth threshold, or may be the sum of the fourth threshold and the third offset.

After the first event is predefined, the first configuration may be used to configure at least one of the first threshold, the second threshold, the third threshold, the fourth threshold, the first offset, the second offset, and the third offset. When the first device is a network device and the second device is a terminal device, the second offset may include one or more of the following: a frequency specific offset, a cell specific offset, a hysteresis, and an event offset that are of a measurement object. The frequency specific offset and the cell specific offset are related offsets configured by the network device for the terminal device for measurement. The hysteresis and the event offset are related offsets configured by the network device for the terminal device for measurement event configuration.

If there are a plurality of measurement objects, when a value of highest channel quality of a measurement object in the plurality of measurement objects is less than the first threshold, that the channel quality of the measurement object is less than the first threshold is met.

In this embodiment of this application, the first device may further send, to the second device, a message carrying a second configuration. The second configuration and the first configuration may be carried in one message or different messages and sent to the second device. The second configuration is used to configure at least one of frequency information, cell information, or system information used by the second device to perform measurement. The second configuration may be used to determine a measurement object corresponding to the first event. Specifically, the frequency information for the measurement may be used to determine that the measurement object is a frequency or a frequency range indicated by the frequency information. The cell information may be a specified measurement object. The system information may be a measurement object in a specified system.

S1202. The second device receives the message that carries the first configuration and that is sent by the first device, and performs measurement within a measurement gap based on the message carrying the first configuration.

In this embodiment of this application, the first device may further send, to the second device, a message carrying a second gap configuration. The second gap configuration is used to configure a time resource used by the second device to perform the measurement. The second device may detect the trigger condition of the first event on the time resource determined by using the second gap configuration. If detecting that the trigger condition of the first event is met, the second device may send the first measurement message to the first device.

In addition, the first device may further send, to the second device, a third configuration carrying a second event. The second event may be an event used by the second device to determine that there is (or may be) a to-be-handed-over measurement object in the measurement objects, for example, an A3 event. The second device may detect the trigger condition of the first event on the time resource determined by using the second gap configuration and also detect a trigger condition of the second event. If detecting that the trigger condition of the first event is met, the second device may send the first measurement message to the first device. If detecting that the trigger condition of the second event is met, the second device may send, to the first device, a message carrying a measurement report of the second event. It may be understood that, the trigger condition detected for the first event is that there is (or may be) no to-be-handed-over measurement object, whereas the trigger condition detected for the second event is that there is (or may be) a to-be-handed-over measurement object. Therefore, when the measurement is performed on the time resource determined by using the second gap configuration, the trigger condition of either of the two events is usually triggered, so that the second device reports a measurement report of the trigger event to the first device. In this way, the first device can obtain the measurement report of the measurement object in a timely manner, and reconfigure the first gap configuration for the first device based on the corresponding measurement report.

S1203. The second device sends the first measurement message to the first device.

In this embodiment of this application, if detecting that the trigger condition of the first event is met, the second device may send the first measurement message to the first device. The first measurement message may include or indicate at least one of the following information: the channel quality of the measurement object, an identifier of the measurement object, information used to indicate that the second device detects no to-be-handed-over measurement object, and a measurement gap configuration expected by the second device.

The measurement gap configuration expected by the second device includes any one or more of the following: a measurement gap repetition period expected by the second device, a measurement gap repetition period that is within a first time and that is expected by the second device, a measurement gap burst repetition period expected by the second device, a measurement gap burst repetition period that is within a second time and that is expected by the second device, a measurement gap length expected by the second device, a measurement gap length that is within a third time and that is expected by the second device, a quantity of repeated measurement gaps per burst that is expected by the second device, a quantity of repeated measurement gaps per burst that is within a fourth time and that is expected by the second device, that the second device expects to cancel the second gap configuration, and that the second device expects to cancel the second gap configuration within a fifth time.

S1204. The first device sends, to the second device, a message carrying the first gap configuration.

S1205. The second device performs the measurement within the measurement gap based on the received first gap configuration.

In this embodiment of this application, for specific descriptions of steps S1204 and S1205, refer to steps S804 and S805 in the embodiment described in FIG. 8. Details are not described herein again.

If there is no to-be-handed-over measurement object, the second device may be triggered, based on the received and newly defined first event, to send the first measurement message to the first device, and the second device may reconfigure the first gap configuration for the first device based on the first measurement message. Compared with the second gap configuration, the first gap configuration can be used to reduce occupancy of a time domain resource for communication of the second device by the measurement gap, and reduce a time spent by the second device on data transmission, thereby improving service quality of the second device.

Figure 13:
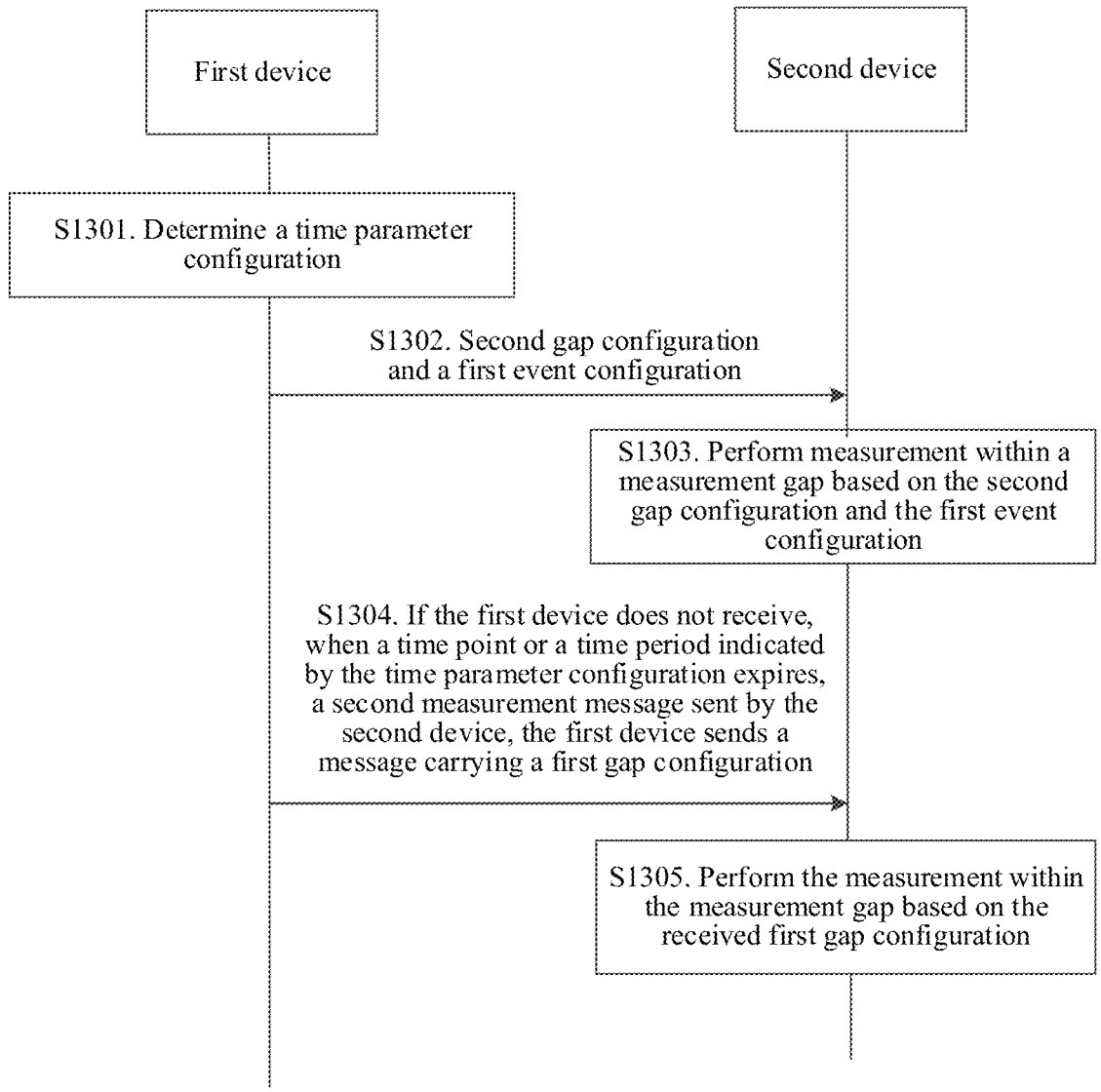
FIG. 13 is a schematic flowchart of yet another measurement method according to an embodiment of this application.

FIG. 13 is a schematic flowchart of yet another measurement method according to an embodiment of this application. In the embodiment described in FIG. 13, a first device sets a time parameter configuration when configuring a second gap configuration and a first event configuration for a second device. If the first device still does not receive, when a time point or a time period indicated by the time parameter configuration expires, a second measurement message used to indicate that a to-be-handed-over measurement object is detected, the first device reconfigures a first gap configuration for the second device.

As shown in FIG. 13, the measurement method includes but is not limited to the following steps S1301 to S1305.

S1301. The first device determines a time parameter configuration.

S1302. The first device sends a second gap configuration and a first event configuration to the second device.

In this embodiment of this application, the first device may further send the second gap configuration and the first event configuration to the second device. The first device may determine the time parameter configuration when the second device has performed a measurement, or when the first device is going to configure a measurement gap for the second device, that is, configure the second gap configuration and the first event configuration. Specifically, the time parameter configuration may be determined when the first device configures the second gap configuration and the first event configuration for the second device. Alternatively, the time parameter configuration may be determined after the first device configures the second gap configuration and the first event configuration for the second device. To be specific, the first device first configures the second gap configuration and the first event configuration for the second device, and the first device determines the time parameter configuration after the second device has performed the measurement within the measurement gap for a period of time. This is not limited in this application.

In this embodiment of this application, the time parameter configuration is used to configure a time at which the first device sends the first gap configuration to the second device, the second gap configuration is used to configure a time resource used by the second device to perform the measurement, and the first event configuration is used to configure an event used to trigger the second device to send a second measurement message for the measurement. In this embodiment of this application, for specific descriptions of the first event configuration and the second gap configuration, refer to the specific descriptions of step S801 in the embodiment described in FIG. 8. Details are not described herein again.

In this embodiment of this application, the time parameter configuration may be a timer, the first device may determine a timing of the timer, and the timer is set for the measurement gap. When the second device has performed the measurement, or when the first device is going to configure the measurement for the second device, the first device may trigger the timer to start timing. Specifically, when the first device configures the measurement gap for the first device, the second timer may be triggered by the first device to start timing. Alternatively, the timer may be triggered at a time different from a time at which the second gap configuration and the first event configuration are delivered. This is not limited in this application.

Alternatively, the time parameter configuration may be a system time (or a range of system times) of the first device or a system frame number (or a range of system frame numbers) of the first device.

S1303. The second device performs the measurement within the measurement gap based on the second gap configuration and the first event configuration.

In this embodiment of this application, the second device may perform the measurement within the measurement gap based on the received second gap configuration and first event configuration, to detect whether there is a to-be-handed-over measurement object. Specifically, the second device detects, on a time resource provided in the second gap configuration, whether the measurement object meets a trigger condition of the first event configuration. For example, the second gap configuration is as follows: MGRP=40 ms and MGL=6 ms, and the first event configuration is an A3 event. In this case, the second device detects, within a defined MGL every 40 ms, whether channel quality of the measurement object is a specific threshold greater than channel quality of a current serving cell. If the foregoing condition is met, the second device sends a measurement report to the first device. If the foregoing condition is not met, the second device does not report any measurement report, and continues to perform the measurement within a next MGL of 40 ms.

S1304. If the first device does not receive, when the time point or the time period indicated by the time parameter configuration expires, the second measurement message sent by the second device, the first device sends, to the second device, a message carrying the first gap configuration.

If the first device does not receive the second measurement message for the measurement that is sent by the second device, at the time point in the time parameter configuration, or within the time period in the time parameter configuration, or at a time point obtained by increasing a time in the time parameter configuration by a first increment, or within a time period obtained by increasing a time in the time parameter configuration by a second increment, the first device sends, to the second device, the message carrying the first gap configuration. The first gap configuration is different from the second gap configuration. It may be understood that, if the first device detects no second measurement message within the time in the time parameter configuration, it indicates that the second device has not triggered the trigger condition of the first event configuration for a period of time. In addition, the trigger condition of the first event configuration is that the first device detects a to-be-handed-over measurement object. Therefore, if the first device detects no second measurement message within the time in the time parameter configuration, the first device determines that there is (or may be) no to-be-handed-over measurement object in measurement objects of the second device. Then, the first device reconfigures the first gap configuration for the second device.

The first gap configuration is different from the second gap configuration, including at least one of the following: A measurement gap repetition period in the first gap configuration is greater than a measurement gap repetition period in the second gap configuration, a measurement gap repetition period in the first gap configuration is greater than a measurement gap repetition period in the second gap configuration within a sixth time, a measurement gap length in the first gap configuration is less than a measurement gap length in the second gap configuration, a measurement gap length in the first gap configuration is less than a measurement gap length in the second gap configuration within a seventh time, a measurement gap burst repetition period in the first gap configuration is greater than a measurement gap burst repetition period in the second gap configuration, a measurement gap burst repetition period in the first gap configuration is greater than a measurement gap burst repetition period in the second gap configuration within an eighth time, a quantity of repeated measurement gaps per burst in the first gap configuration is less than a quantity of repeated measurement gaps per burst in the second gap configuration, a quantity of repeated measurement gaps per burst in the first gap configuration is less than a quantity of repeated measurement gaps per burst in the second gap configuration within a ninth time, the first gap configuration is to cancel the second gap configuration, and the first gap configuration indicates that the second device cancels the second gap configuration within a tenth time.

In this embodiment of this application, if the first device receives, before the time indicated by the time parameter configuration arrives, the second measurement message sent by the second device, it indicates that the second device obtains a to-be-handed-over measurement object through measurement. When receiving the second measurement message, the first device may cancel the time parameter configuration.

In this embodiment of this application, there may be one or more time parameter configurations. After sending, to the second device, the message carrying the first gap configuration, the first device may determine another time parameter configuration, and perform step S1301 by using the another time parameter configuration. Specifically, for example, the time parameter configuration is a timer (timer). As shown in FIG. 9, the first device first locally starts the timer 1, and sends the second gap configuration and the first event configuration to the second device. The second gap configuration may be a uniform measurement gap, and may be as follows: MGL=6 ms and MGRP=40 ms. The second device performs the measurement within the measurement gap based on the second gap configuration and the first event configuration, to measure whether there is a to-be-handed-over measurement object.

If the first device does not receive, when a time point or a time period specified by the timer 1 expires, the second measurement message sent by the second device, the first device sends, to the second device, the message carrying the first gap configuration. As shown in FIG. 9, the first gap configuration may be a uniform measurement gap, and may be as follows: MGL=6 ms and MGRP=80 ms. The first device resets and starts the timer 2, and the timing of the timer 2 may be longer than the timing of the timer 1. If the first device does not receive, when a time point or a time period specified by the timer 2 expires, a measurement message sent by the second device (a measurement message reported by the second device to the first device after the first event configuration is triggered), the first device sends, to the second device, a message carrying a third gap configuration. Compared with the first gap configuration, the third gap configuration may be one or more of a longer measurement gap repetition period, a longer measurement gap burst repetition period, a shorter measurement gap length, a smaller quantity of repeated measurement gaps per burst, and canceling the first measurement gap configuration. As shown in FIG. 9, the third gap configuration may be a non-uniform measurement gap, and may be as follows: MGL=6 ms, MGRP=40 ms, and LMGRP=1.28 s.

A plurality of timers (the timer 1 and the timer 2) may be set simultaneously by the first device, for example, set simultaneously by the first device when the second gap configuration and the first event configuration are delivered, and are started sequentially. As shown in FIG. 9, the timer 1 is first started, and then the timer 2 is started when the timer 1 expires. Alternatively, a plurality of timers (the timer 1 and the timer 2) may not be set simultaneously. For example, the timer 1 is first set and started, and then the timer 2 is set and started when the timer 1 expires.

In addition, the plurality of timers may be set and started simultaneously by the first device. As shown in FIG. 10, the timer 1 and the timer 2 may be set simultaneously by the first device. For example, the timer 1 and the timer 2 are set and start timing simultaneously when the first device sends the second gap configuration and the first event configuration to the second device, and timing duration specified by the timer 2 is greater than timing duration specified by the timer 1. If the first device does not receive, when the timing of the timer 1 expires, the second measurement message sent by the second device, the first device sends, to the second device, the message carrying the first gap configuration. The first gap configuration may be a uniform measurement gap, and may be as follows: MGL=6 ms and MGRP=80 ms. If the first device does not receive, when the time point or the time period specified by the timer 2 expires, a measurement message sent by the second device (a measurement message reported by the second device to the first device after a first event configuration is triggered), the first device sends, to the second device, the message carrying the third gap configuration.

When the time parameter configuration is the system time (or the range of system times) or the system frame number (or the range of system frame numbers), the time parameter configuration may be a plurality of system times (or ranges of system times) or system frame numbers (or ranges of system frame numbers). Similar to the case of the foregoing timer, details are not described herein again.

S1305. The first device performs the measurement within the measurement gap based on the received first gap configuration.

The first device may set the time parameter configuration. If the second device does not send, to the first device before the time indicated by the time parameter configuration arrives, related information that a to-be-handed-over measurement object is detected, the first device determines that there is (or may be) no to-be-handed-over measurement object. In this case, the first device reconfigures the first measurement gap configuration for the second device. After receiving the reconfigured first gap configuration sent by the first device, the second device performs the measurement within the measurement gap based on parameters of the foregoing reconfigured the first gap configuration, and detects whether to trigger the first event configuration, to detect whether there is a to-be-handed-over measurement object. When channel quality of all measurement objects is poor, a change in the measurement parameter can reduce frequent occupancy of uplink and downlink time domain resources of the second device by the measurement gap, thereby improving service quality of the second device.

The foregoing describes in detail the methods in the embodiments of this application. The following describes devices provided in the embodiments of this application.

Figure 14:
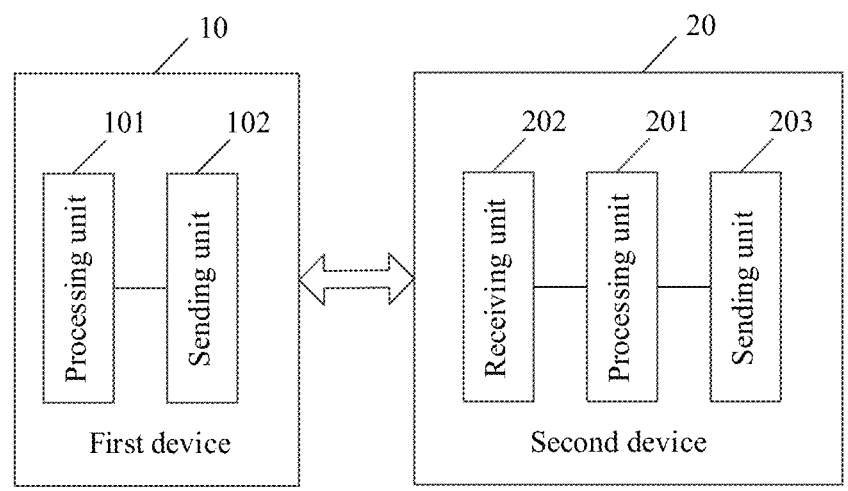
FIG. 14 is a schematic structural diagram of a first device 10 and a second device 20 according to an embodiment of this application.

Based on an architecture of the network system in FIG. 1, FIG. 14 is a schematic structural diagram of a first device 10 and a second device 20 according to an embodiment of this application. As shown in FIG. 14, there may be a communication connection between the first device 10 and the second device 20, to implement data communication between the two devices. Descriptions are provided below.

As shown in FIG. 14, the first device 10 may include a processing unit 101 and a sending unit 102.

The processing unit 101 is configured to generate a message carrying a time parameter configuration.

The sending unit 102 is configured to send, to the second device 20, the message carrying the time parameter configuration.

The time parameter configuration is used to configure a time at which the second device 20 sends a first measurement message.

In a possible implementation, the sending unit 102 is further configured to send, to the second device 20, a message carrying a second gap configuration and a first event configuration. The second gap configuration is used to configure a time resource used by the second device 20 to perform measurement, and the first event configuration is used to configure an event used to trigger the second device 20 to send a second measurement message.

In a possible implementation, the sending unit 102 is further configured to: if the first device receives the first measurement message sent by the second device, at a time point in the time parameter configuration, or within a time period in the time parameter configuration, or at a time point obtained by increasing a time in the parameter configuration by a first increment, or within a time period obtained by increasing a time in the time parameter configuration by a second increment, send, to the second device 20, a message carrying a first gap configuration. The first gap configuration is different from the second gap configuration.

As shown in FIG. 14, the second device 20 may include a processing unit 201, a receiving unit 202, and a sending unit 203.

The receiving unit 202 is configured to receive, from the first device 10, the message carrying the time parameter configuration.

The time parameter configuration is used to configure the time at which the second device 20 sends the first measurement message.

The processing unit 201 is configured to generate the first measurement message.

The sending unit 203 is configured to send the first measurement message at a time point in the time parameter configuration, or within a time period in the time parameter configuration, or at a time point obtained by increasing a time in the time parameter configuration by a time increment, or within a time period obtained by increasing a time in the time parameter configuration by a time increment.

In a possible implementation, before the sending unit 203 sends the first measurement message, the receiving unit 202 is further configured to receive a message that carries a second gap configuration and a first event configuration and that is sent by the first device 10.

The first gap configuration is used to configure the time resource used by the second device 20 to perform the measurement.

The first event configuration is used to configure the event used to trigger the second device 20 to send the second measurement message.

In a possible implementation, after the sending unit 203 sends the first measurement message, the receiving unit 202 is further configured to receive the first gap configuration sent by the first device 10. The first gap configuration is different from the second gap configuration.

In this embodiment, for functions of the processing unit 101 and the sending unit 102 of the first device 10 and the processing unit 201, the receiving unit 202, and the sending unit 203 of the second device 20, refer to the corresponding descriptions in the measurement method embodiment shown in FIG. 8. Details are not described herein again.

Figure 15:
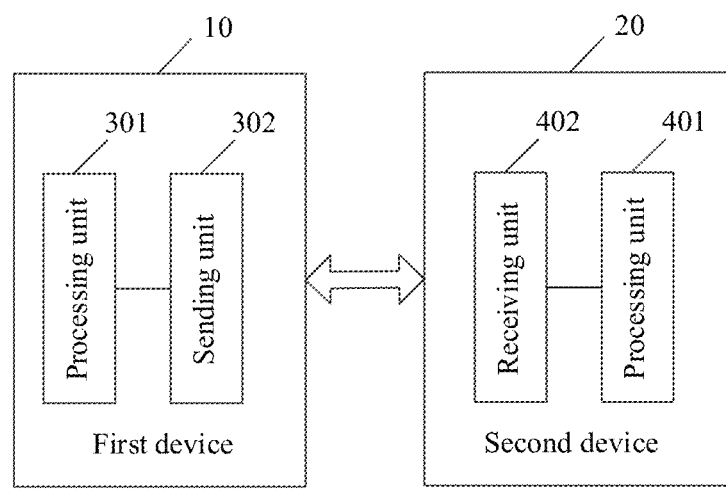
FIG. 15 is another schematic structural diagram of a first device 10 and a second device 20 according to an embodiment of this application.

Based on an architecture of the network system in FIG. 1, FIG. 15 is another schematic structural diagram of a first device 10 and a second device 20 according to an embodiment of this application. As shown in FIG. 15, there may be a communication connection between the first device 10 and the second device 20, to implement data communication between the two devices. Descriptions are provided below.

As shown in FIG. 15, the first device 10 may include a processing unit 301 and a sending unit 302.

The processing unit 301 is configured to generate a message carrying a time parameter configuration.

The sending unit 302 is configured to send, to the second device 20, the message carrying the time parameter configuration.

The time parameter configuration is used to configure a time at which the first device 10 sends a first gap configuration to the second device 20.

In a possible implementation, the sending unit 302 is further configured to send, to the second device 20, a message carrying a second gap configuration and a first event configuration. The second gap configuration is used to configure a time resource used by the second device 20 to perform measurement, and the first event configuration is used to configure an event used to trigger the second device 20 to send a second measurement message.

In a possible implementation, the sending unit 302 is further configured to: if the first device 10 does not receive the second measurement message sent by the second device 20, at a time point in the time parameter configuration, or within a time period in the time parameter configuration, or at a time point obtained by increasing a time in the parameter configuration by a first increment, or within a time period obtained by increasing a time in the time parameter configuration by a second increment, send, to the second device 20, a message carrying the first gap configuration. The first gap configuration is different from the second gap configuration.

As shown in FIG. 15, the second device 20 may include a processing unit 401 and a receiving unit 402.

The receiving unit 402 is configured to receive the time parameter configuration from the first device.

The time parameter configuration is used to configure a time at which the second device receives the first gap configuration sent by the first device.

The processing unit 401 is configured to generate the first gap configuration.

The receiving unit 402 is further configured to receive the first gap configuration sent by the first device, at a time point in the time parameter configuration, or within a time period in the time parameter configuration, or at a time point obtained by increasing a time in the time parameter configuration by a time increment, or within a time period obtained by increasing a time in the time parameter configuration by a time increment.

In a possible implementation, before the receiving unit 402 receives the first gap configuration sent by the first device, the receiving unit 402 is further configured to receive the second gap configuration and the first event configuration that are sent by the first device.

The second gap configuration is used to configure the time resource used by the second device to perform the measurement, and the first gap configuration is different from the second gap configuration.

The first event configuration is used to configure the event used to trigger the second device to send the second measurement message.

In this embodiment described in FIG. 15, for functions of the processing unit 301 and the sending unit 302 in the first device 10 and the processing unit 401 and the receiving unit 402 in the second device 20, refer to the corresponding descriptions in the measurement method embodiment shown in FIG. 11. Details are not described herein again.

Figure 16:
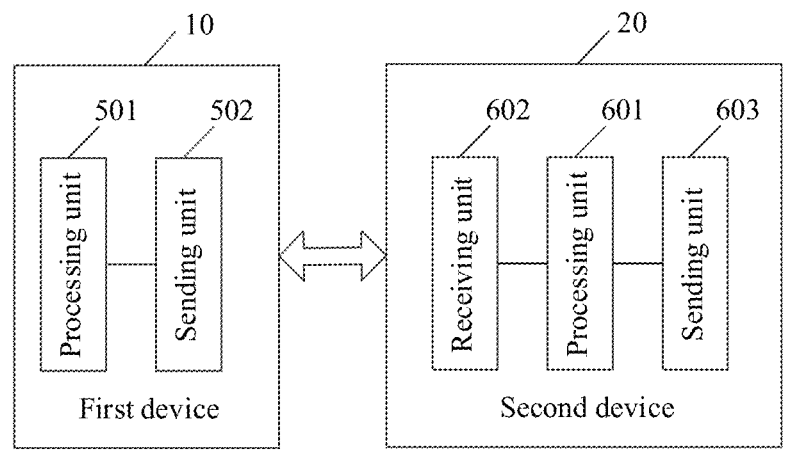
FIG. 16 is still another schematic structural diagram of a first device 10 and a second device 20 according to an embodiment of this application.

Based on an architecture of the network system in FIG. 1, FIG. 16 is still another schematic structural diagram of a first device 10 and a second device 20 according to an embodiment of this application. As shown in FIG. 16, there may be a communication connection between the first device 10 and the second device 20, to implement data communication between the two devices. Descriptions are provided below.

As shown in FIG. 16, the first device 10 may include a processing unit 501 and a sending unit 502.

The processing unit 501 is configured to generate a message carrying a first configuration.

The sending unit 502 is configured to send, to the second device 20, the message carrying the first configuration.

The first configuration is used to indicate that a first event is used to trigger the second device 20 to send a first measurement message.

The first event includes at least one of the following: Channel quality of a measurement object is less than a first threshold, the channel quality of the measurement object is lower than channel quality of a serving cell of the second device, the channel quality of the measurement object is less than the first threshold and the channel quality of the serving cell of the second device is greater than a second threshold, and the channel quality of the measurement object is lower than the channel quality of the serving cell of the second device and the channel quality of the serving cell of the second device is greater than the second threshold.

In a possible implementation, the sending unit 502 is further configured to send, to the second device 20, a message carrying a second gap configuration.

The second gap configuration is used to configure a time resource used by the second device 20 to perform measurement.

In a possible implementation, the first device 10 further includes a receiving unit 503. After the sending unit 502 sends the second gap configuration to the second device 20, the receiving unit 503 is configured to receive the first measurement message sent by the second device 20.

The sending unit 502 is further configured to send a first gap configuration to the second device 20. The first gap configuration is different from the second gap configuration.

As shown in FIG. 16, the second device 20 may include a processing unit 601 and a receiving unit 602.

The receiving unit 602 is configured to receive the message that carries the first configuration and that is sent by the first device 10.

The first configuration is used to indicate that the first event is used to trigger the second device 20 to send the first measurement message.

The processing unit 601 is configured to generate the first measurement message.

The first event includes at least one of the following: The channel quality of a measurement object is less than the first threshold, the channel quality of the measurement object is lower than the channel quality of the serving cell of the second device, the channel quality of the measurement object is less than the first threshold and the channel quality of the serving cell of the second device is greater than the second threshold, and the channel quality of the measurement object is lower than the channel quality of the serving cell of the second device and the channel quality of the serving cell of the second device is greater than the second threshold. The second device 20 sends the first measurement message to the first device when the first event is triggered.

In a possible implementation, the receiving unit 602 is further configured to receive the message that carries the second gap configuration and that is sent by the first device 10.

The second gap configuration is used to configure the time resource used by the second device to perform the measurement.

In a possible implementation, the second device 20 further includes a sending unit 603. After the receiving unit 602 receives the message that carries the second gap configuration and that is sent by the first device 10, the sending unit 603 is configured to send the first measurement message to the first device 10 when the first event is triggered.

The receiving unit 602 is further configured to receive the first gap configuration sent by the first device 10. The first gap configuration is different from the second gap configuration.

In this embodiment described in FIG. 16, for functions of the processing unit 501 and the sending unit 502 of the first device 10 and the processing unit 601, the receiving unit 602, and the sending unit 603 of the second device 20, refer to the corresponding descriptions in the measurement method embodiment shown in FIG. 12. Details are not described herein again.

Figure 17:
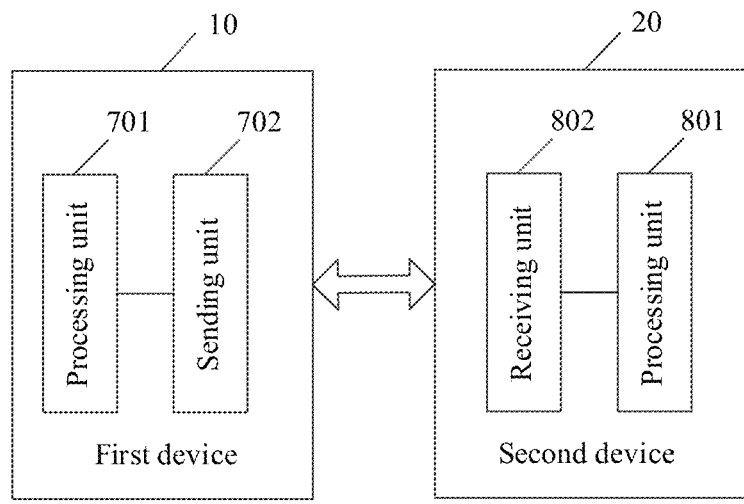
FIG. 17 is yet another schematic structural diagram of a first device 10 and a second device 20 according to an embodiment of this application.

Based on an architecture of the network system in FIG. 1, FIG. 17 is yet another schematic structural diagram of a first device 10 and a second device 20 according to an embodiment of this application. As shown in FIG. 17, there may be a communication connection between the first device 10 and the second device 20, to implement data communication between the two devices. Descriptions are provided below.

As shown in FIG. 17, the first device 10 may include a processing unit 701.

The processing unit 701 is configured to determine a time parameter configuration. The time parameter configuration is used to configure a time at which the first device 10 sends a first gap configuration to the second device 20.

In an embodiment, the first device 10 further includes a sending unit 702. The sending unit 702 is configured to send, to the second device 20, a message carrying a second gap configuration and a first event configuration. The second gap configuration is used to configure a time resource used by the second device 20 to perform measurement, and the first event configuration is used to configure an event used to trigger the second device 20 to send a second measurement message.

In an embodiment, the sending unit 702 is further configured to: if the first device 10 does not receive the second measurement message sent by the second device 20, at a time point in the time parameter configuration, or within a time period in the time parameter configuration, or at a time point obtained by increasing a time in the parameter configuration by a first increment, or within a time period obtained by increasing a time in the time parameter configuration by a second increment, send, to the second device 20, a message carrying the first gap configuration. The first gap configuration is different from the second gap configuration.

In an embodiment, the second gap configuration, the first event configuration, and the time parameter configuration are carried in one message or different messages and sent to the second device 20.

In an embodiment, the measurement is inter-frequency measurement or inter-RAT measurement.

In an embodiment, the first device 10 is a network device or a terminal device, and the second device 20 is a network device or a terminal device.

As shown in FIG. 17, the second device 20 may include a processing unit 801 and a receiving unit 802.

The receiving unit 802 is further configured to receive the message that carries the second gap configuration and the first event configuration and that is sent by the first device 10. The second gap configuration is used to configure the time resource used by the second device 20 to perform the measurement, and the first event configuration is used to configure the event used to trigger the second device 20 to send the second measurement message.

The processing unit 801 is configured to perform measurement within a measurement gap based on the second gap configuration and the first event configuration.

In an embodiment, the receiving unit 802 is further configured to: if the first device 10 does not receive the second measurement message sent by the second device 20, at a time point in the time parameter configuration, or within a time period in the time parameter configuration, or at a time point obtained by increasing a time in the parameter configuration by a first increment, or within a time period obtained by increasing a time in the time parameter configuration by a second increment, receive the message that carries the first gap configuration and that is sent by the first device 10. The first gap configuration is different from the second gap configuration.

In an embodiment, the second gap configuration, the first event configuration, and the time parameter configuration are carried in one message or different messages and sent to the second device 20.

In an embodiment, the measurement is inter-frequency measurement or inter-RAT measurement.

In an embodiment, the first device 10 is a network device or a terminal device, and the second device 20 is a network device or a terminal device.

In this embodiment described in FIG. 17, for functions of the processing unit 701 and the sending unit 702 in the first device 10 and the processing unit 601 and the receiving unit 602 in the second device 20, refer to the corresponding descriptions in the measurement method embodiment shown in FIG. 13. Details are not described again.

Figure 18:
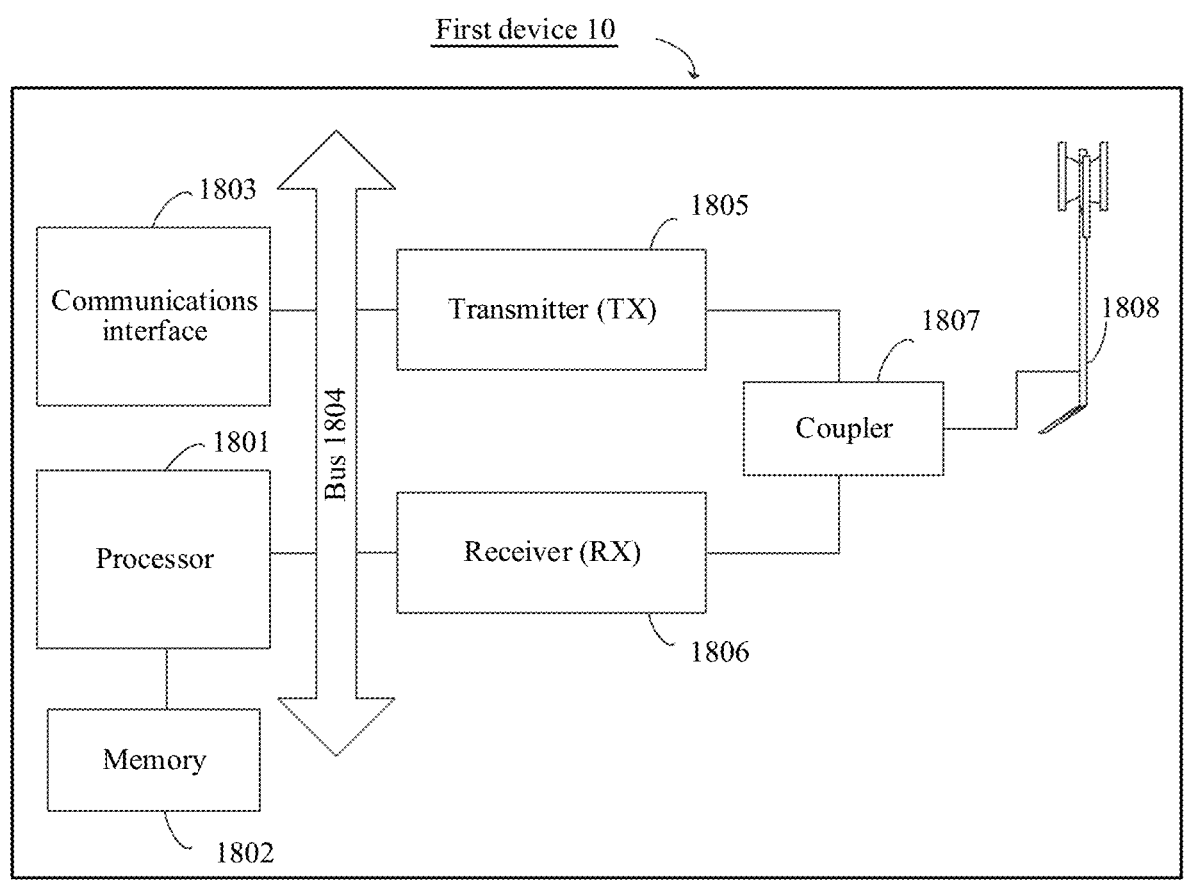
FIG. 18 is a schematic structural diagram of a first device 10 according to an embodiment of this application.

Based on an architecture of the network system in FIG. 1, FIG. 18 is a schematic structural diagram of a first device 10 according to an embodiment of this application. As shown in FIG. 18, the first device 10 includes one or more processors 1801, a memory 1802, a communications interface 1803, a transmitter 1805, a receiver 1806, a coupler 1807, and an antenna 1808. These components may be connected by using a bus 1804 or in another manner. In FIG. 18, a bus connection is used as an example.

The communications interface 1803 may be configured for communication between the first device 10 and another communications device, for example, a second device 20. Specifically, the communications interface 1803 may be a communications interface in a long term evolution (long term evolution, LTE) system, or may be a communications interface in 5G or future new radio. The communications interface 1803 is not limited to a wireless communications interface, and the first device 10 may further be provided with a wired communications interface 1803 to support wired communication. For example, a backhaul link between a first device 10 and another network device may be a wired communication connection.

The transmitter 1805 may be configured to transmit a message or data that is output by the processor 1801.

In some embodiments of this application, the transmitter 1805 and the receiver 1806 may be considered as a wireless modem. In the first device 10, there may be one or more transmitters 1805 and receivers 1806. The transmitter 1805 and the receiver 1806 may alternatively be implemented by one or more transceivers. The antenna 1808 may be configured to convert electromagnetic energy in a transmission line into an electromagnetic wave in free space, or convert an electromagnetic wave in free space into electromagnetic energy in a transmission line. The coupler 1807 may be configured to divide a mobile communications signal into a plurality of signals and allocate the plurality of signals to a plurality of receivers 1806.

The memory 1802 is coupled to the processor 1801, and is configured to store various software programs and/or a plurality of groups of instructions. The memory 1802 may store an operating system (a system for short below), for example, an embedded operating system such as uCOS, VxWorks, or RTLinux. The memory 1802 may further store a program for measurement method. The program for the measurement method may be configured to communicate with one or more additional devices and one or more second devices.

The processor 1801 may be configured to: manage a wireless channel, implement a call, establish and remove a communications link, perform measurement, and the like.

In this embodiment of this application, the processor 1801 may be configured to read and execute a computer-readable instruction. Specifically, the processor 1801 may be configured to invoke the program for the measurement method that is stored in the memory 1802. The memory 1802 may be configured to store an implementation program, on the first device 10 side, for measurement methods provided in one or more embodiments of this application. Specifically, the processor 1801 may be configured to invoke the program for the measurement method that is stored in the memory 1802, to perform steps, on the first device 10 side, of the measurement method shown in any one of FIG. 8, FIG. 11, FIG. 12, and FIG. 13.

It should be noted that the first device 10 shown in FIG. 18 is merely an implementation of the embodiments of this application. During actual application, the first device 10 may further include more or fewer components. This is not limited herein.

Figure 19:
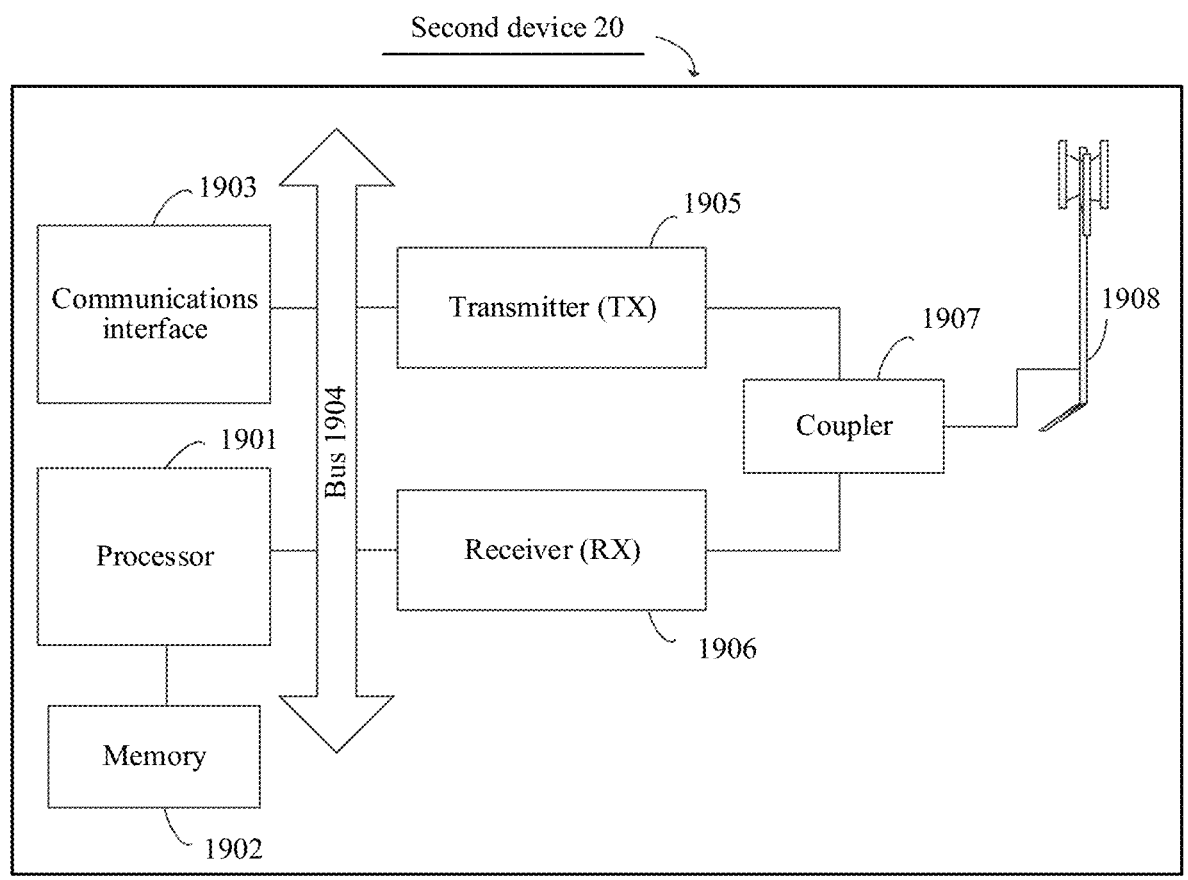
FIG. 19 is a schematic structural diagram of a second device 20 according to an embodiment of this application.

Based on an architecture of the network system in FIG. 1, FIG. 19 is a schematic structural diagram of a second device 20 according to an embodiment of this application. As shown in FIG. 19, the second device 20 includes one or more processors 1901, a memory 1902, a communications interface 1903, a transmitter 1905, a receiver 1906, a coupler 1907, and an antenna 1908. These components may be connected by using a bus 1904 or in another manner. In FIG. 19, a bus connection is used as an example.

The communications interface 1903 may be configured for communication between the second device 20 and another communications device, for example, a first device 10. Specifically, the communications interface 1903 may be a communications interface in an LTE system, or may be a communications interface in 5G or future new radio. The communications interface 1903 is not limited to a wireless communications interface, and the second device 20 may further be provided with a wired communications interface 1903 to support wired communication. For example, a backhaul link between a second device 20 and another network device may be a wired communication connection.

The transmitter 1905 may be configured to transmit a message or data that is output by the processor 1901.

In some embodiments of this application, the transmitter 1905 and the receiver 1906 may be considered as a wireless modem. There may be one or more transmitters 1905 and receivers 1906 in the second device 20. The transmitter 1905 and the receiver 1906 may alternatively be implemented by one or more transceivers. The antenna 1908 may be configured to convert electromagnetic energy in a transmission line into an electromagnetic wave in free space, or convert an electromagnetic wave in free space into electromagnetic energy in a transmission line. The coupler 1907 may be configured to divide a mobile communications signal into a plurality of signals and allocate the plurality of signals to a plurality of receivers 1906.

The memory 1902 is coupled to the processor 1901, and is configured to store various software programs and/or a plurality of groups of instructions. The memory 1902 may store an operating system (a system for short below), for example, an embedded operating system such as uCOS, VxWorks, or RTLinux. The memory 1902 may further store a program for measurement method. The program for the measurement method may be configured to communicate with one or more additional devices and one or more first devices 10.

The processor 1901 may be configured to: manage a wireless channel, implement a call, establish and remove a communications link, perform measurement, and the like.

In this embodiment of this application, the processor 1901 may be configured to read and execute a computer-readable instruction. Specifically, the processor 1901 may be configured to invoke the program for the measurement method that is stored in the memory 1902. The memory 1902 may be configured to store an implementation program, on the second device 20 side, for measurement methods provided in one or more embodiments of this application. Specifically, the processor 1901 may be configured to invoke the program for the measurement method that is stored in the memory 1902, to perform steps, on the second device 20 side, of the measurement method shown in any one of FIG. 8, FIG. 11, FIG. 12, and FIG. 13.

It should be noted that the second device 20 shown in FIG. 19 is merely an implementation of the embodiments of this application. During actual application, the second device 20 may further include more or fewer components. This is not limited herein.

Steps of methods or algorithms described with reference to the content disclosed in the embodiments of the present invention may be implemented by hardware, or may be implemented by a processor by executing a software instruction. The software instruction may include a corresponding software module. The software module may be stored in a RAM, a flash memory, a ROM, an erasable programmable read-only memory (erasable programmable ROM, EPROM), an electrically erasable programmable read-only memory (electrically EPROM, EEPROM), a register, a hard disk, a removable hard disk, a compact disc read-only memory (CD-ROM), or a storage medium in any other forms well-known in the art. For example, a storage medium is coupled to a processor, so that the processor can read information from the storage medium and write the information into the storage medium. Certainly, the storage medium may alternatively be a component of the processor. The processor and the storage medium may be located in an ASIC. In addition, the ASIC may be located in a transceiver or a relay device. Certainly, the processor and the storage medium may exist in a first device or the second device as discrete components.

It may be understood that, in this application, technical terms and technical solutions between different embodiments may be mutually referenced and mutually cited based on logic of the embodiments, and the embodiments to which the technical terms and the technical solutions are applicable are not limited in this application. The technical solutions in different embodiments are combined with each other, and a new embodiment may further be formed.

It may be understood that, the processor in the embodiments of this application may be a central processing unit (central processing unit, CPU), or may be another general-purpose processor, a digital signal processor (digital signal processor, DSP), an application-specific integrated circuit (application specific integrated circuit, ASIC), a field programmable gate array (field programmable gate array, FPGA) or another programmable logic device, a transistor logic device, a hardware component, or any combination thereof. The general-purpose processor may be a microprocessor or any conventional processor.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instruction is loaded and executed on a computer, some or all of the procedures or functions according to the embodiments of this application are generated. The computer may be a general-purpose computer, a special-purpose computer, a computer network, or another programmable apparatus. The computer instruction may be stored in a computer-readable storage medium, or transmitted by using a computer-readable storage medium. The computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

A person of ordinary skill in the art may understand that all or some of the processes of the methods in the embodiments may be implemented by a computer program instructing relevant hardware. The program may be stored in a computer-readable storage medium. When the program is executed, procedures of the forgoing method embodiments may be included. The foregoing storage medium includes any medium that can store program code, such as a ROM, a random access memory RAM, a magnetic disk, or an optical disk.

What is claimed is:

1. A measurement method, comprising:
sending, by a first device to a second device, a first message including a first configuration, wherein the first configuration indicates that a first event triggers the second device to send a first measurement message;
sending, by the first device, a second message including a second gap configuration;
sending, by the first device, a third message including a first gap configuration in response to the first device failing to receive a second measurement message sent by the second device or the first device receiving the first measurement message sent by the second device within a time period obtained by increasing a time in the time parameter configuration by an increment,
wherein the first gap configuration is different from the second gap configuration, and
the first event includes at least:
a channel quality of a measurement object is less than a first threshold,
the channel quality of the measurement object is lower than a channel quality of a serving cell of the second device,
the channel quality of the measurement object is less than the first threshold, and the channel quality of the serving cell of the second device is greater than a second threshold, or
the channel quality of the measurement object is lower than the channel quality of the serving cell of the second device and the channel quality of the serving cell of the second device is greater than the second threshold.

2. The method according to claim 1, wherein
the channel quality of the measurement object is less than the first threshold comprises:
the channel quality of the measurement object is less than a third threshold, or the channel quality of the measurement object is less than a sum of a third threshold and a first offset;
the channel quality of the measurement object is lower than the channel quality of the serving cell of the second device comprises:
the channel quality of the measurement object is less than a sum of the channel quality of the serving cell of the second device and a second offset; and
the channel quality of the serving cell of the second device is greater than the second threshold comprises:
the channel quality of the serving cell of the second device is greater than a fourth threshold, or the channel quality of the serving cell of the second device is greater than a sum of a fourth threshold and a third offset.

3. The method according to claim 1, wherein
the first gap configuration is useable to configure a time resource of the second device for measurement.

4. The method according to claim 3, wherein after the sending, by the first device to the second device, the second message including the first gap configuration, the method further comprises:
receiving, by the first device, the first measurement message from the second device.

5. A measurement method, comprising:
receiving, by a second device, a first message including a first configuration from a first device, wherein the first configuration indicates that a first event triggers the second device to send a first measurement message;
receiving, by the second device, a second message including a second gap configuration;
receiving, by the second device, a third message including a first gap configuration in response to the first device failing to receive a second measurement message sent by the second device or the first device receiving the first measurement message sent by the second device within a time period obtained by increasing a time in the time parameter configuration by an increment,
wherein the first gap configuration is different from the second gap configuration, and
the first event includes at least:
a channel quality of a measurement object is less than a first threshold, the channel quality of the measurement object is lower than a channel quality of a serving cell of the second device, the channel quality of the measurement object is less than the first threshold and the channel quality of the serving cell of the second device is greater than a second threshold, or the channel quality of the measurement object is lower than the channel quality of the serving cell of the second device and the channel quality of the serving cell of the second device is greater than the second threshold; and sending, by the second device, the first measurement message to the first device in response to the first event being triggered.

6. The method according to claim 5, wherein the channel quality of the measurement object is less than the first threshold comprises:

the channel quality of the measurement object is less than a third threshold, or the channel quality of the measurement object is less than a sum of a third threshold and a first offset;

the channel quality of the measurement object is lower than the channel quality of the serving cell of the second device comprises:

the channel quality of the measurement object is less than a sum of the channel quality of the serving cell of the second device and a second offset; and the channel quality of the serving cell of the second device is greater than the second threshold comprises:

the channel quality of the serving cell of the second device is greater than a fourth threshold, or the channel quality of the serving cell of the second device is greater than a sum of a fourth threshold and a third offset.

7. The method according to claim 5, wherein the first gap configuration is useable to configure a time resource of the second device configured for measurement.

8. The method according to claim 7, wherein after the receiving, by the second device, the message including the first gap configuration from the first device, the method further comprises:

sending, by the second device, the first measurement message to the first device in response to the first event being triggered.

9. The method according to claim 5, wherein the first measurement message includes at least:

the channel quality of the measurement object, an identifier of the measurement object, information indicating that the second device failed to detect a to-be-handed-over measurement object, or a measurement gap configuration expected by the second device.

10. The method according to claim 9, wherein the measurement gap configuration expected by the second device includes at least:

a measurement gap repetition period expected by the second device;

the measurement gap repetition period is within a first timeframe and is expected by the second device;

a measurement gap burst repetition period expected by the second device;

the measurement gap burst repetition period is within a second timeframe and is expected by the second device;

a measurement gap length expected by the second device;

the measurement gap length is within a third timeframe and is expected by the second device;

a quantity of repeated measurement gaps per burst expected by the second device;

the quantity of repeated measurement gaps per burst is within a fourth timeframe and is expected by the second device;

the second device is configured to cancel the second gap configuration; or the second device is configured to cancel the second gap configuration within a fifth timeframe.

11. The method according to claim 8, wherein receiving, by the second device, the message including the second gap configuration further includes at least:

a measurement gap repetition period in the second gap configuration is greater than a measurement gap repetition period in the first gap configuration;

the measurement gap repetition period in the second gap configuration is greater than the measurement gap repetition period in the first gap configuration within a sixth timeframe;

a measurement gap length in the second gap configuration is less than a measurement gap length in the first gap configuration;

the measurement gap length in the second gap configuration is less than a measurement gap length in the first gap configuration within a seventh timeframe;

a measurement gap burst repetition period in the second gap configuration is greater than a measurement gap burst repetition period in the first gap configuration;

the measurement gap burst repetition period in the second gap configuration is greater than a measurement gap burst repetition period in the first gap configuration within an eighth timeframe;

a quantity of repeated measurement gaps per burst in the second gap configuration is less than a quantity of repeated measurement gaps per burst in the first gap configuration;

the quantity of repeated measurement gaps per burst in the second gap configuration is less than a quantity of repeated measurement gaps per burst in the first gap configuration within a ninth timeframe;

the second gap configuration corresponds to cancelling the first gap configuration; and the second gap configuration indicates that the second device cancels the first gap configuration within a tenth timeframe.

12. A measurement method, comprising:

sending, by a first device to a second device, a message including a time parameter configuration, wherein the time parameter configuration is usable to configure a time at which the second device is configured to send a first measurement message, or is useable to configure a time at which the first device is configured to send a first gap configuration to the second device;

sending, by the first device to the second device, a first message including a second gap configuration and a first event configuration; and sending, by the first device to the second device, a second message including the first gap configuration in response to the first device failing to receive a second measurement message sent by the second device or the first device receiving the first measurement message sent by the second device within a time period obtained by increasing a time in the time parameter configuration by an increment, wherein the first gap configuration is different from the second gap configuration.

13. The method according to claim 12, wherein
the second gap configuration is useable to configure a time resource useable by the second device to perform measurement, and
the first event configuration is useable to configure an event useable to trigger the second device to send the second measurement message.

14. The method according to claim 12, wherein the first measurement message includes at least:
a channel quality of a measurement object,
an identifier of the measurement object,
information indicating that the second device fails to detect a to-be-handed-over measurement object, or
a measurement gap configuration expected by the second device.

15. The method according to claim 14, wherein the measurement gap configuration expected by the second device includes at least:
a measurement gap repetition period expected by the second device;
the measurement gap repetition period is within a first timeframe and is expected by the second device;
a measurement gap burst repetition period expected by the second device;
the measurement gap burst repetition period is within a second timeframe and is expected by the second device;
a measurement gap length expected by the second device;
the measurement gap length is within a third timeframe and is expected by the second device;
a quantity of repeated measurement gaps per burst is expected by the second device;
the quantity of repeated measurement gaps per burst is within a fourth timeframe and is expected by the second device;
the second device is configured to cancel the second gap configuration; or
the second device is configured to cancel the second gap configuration within a fifth timeframe.

16. The method according to claim 13, wherein the first gap configuration is different from the second gap configuration, and includes at least:
a measurement gap repetition period in the first gap configuration is greater than a measurement gap repetition period in the second gap configuration;
the measurement gap repetition period in the first gap configuration is greater than the measurement gap repetition period in the second gap configuration within a sixth timeframe;
a measurement gap length in the first gap configuration is less than a measurement gap length in the second gap configuration;
the measurement gap length in the first gap configuration is less than the measurement gap length in the second gap configuration within a seventh timeframe;
a measurement gap burst repetition period in the first gap configuration is greater than a measurement gap burst repetition period in the second gap configuration;
the measurement gap burst repetition period in the first gap configuration is greater than the measurement gap burst repetition period in the second gap configuration within an eighth timeframe;
a quantity of repeated measurement gaps per burst in the first gap configuration is less than a quantity of repeated measurement gaps per burst in the second gap configuration;
the quantity of repeated measurement gaps per burst in the first gap configuration is less than the quantity of repeated measurement gaps per burst in the second gap configuration within a ninth timeframe;
the first gap configuration corresponds to cancelling the second gap configuration; or
the first gap configuration indicates that the second device cancels the second gap configuration within a tenth timeframe.

* * * * *